(12) United States Patent
Yamane et al.

(10) Patent No.: US 8,264,528 B2
(45) Date of Patent: Sep. 11, 2012

(54) DISPLAY APPARATUS, FRAME MEMBER, AND REFLECTION SUPPRESSING MEMBER

(75) Inventors: Toru Yamane, Kobe (JP); Shinya Tanaka, Kobe (JP)

(73) Assignee: Fujitsu Ten Limited, Kobe-Shi (JP)

( * ) Notice: Subject to any disclaimer, the term of this patent is extended or adjusted under 35 U.S.C. 154(b) by 1492 days.

(21) Appl. No.: 11/792,714

(22) PCT Filed: Nov. 2, 2005

(86) PCT No.: PCT/JP2005/020235
§ 371 (c)(1),
(2), (4) Date: Jun. 11, 2007

(87) PCT Pub. No.: WO2006/064619
PCT Pub. Date: Jun. 22, 2006

(65) Prior Publication Data
US 2008/0106595 A1    May 8, 2008

(30) Foreign Application Priority Data

Dec. 14, 2004 (JP) ................................ 2004-361866
Jun. 28, 2005 (JP) ................................ 2005-188358
Aug. 30, 2005 (JP) ................................ 2005-249689

(51) Int. Cl.
*H04N 7/18* (2006.01)
(52) U.S. Cl. ......................................... 348/59; 348/53
(58) Field of Classification Search .............. 348/51–59, 348/60
See application file for complete search history.

(56) References Cited

U.S. PATENT DOCUMENTS

| 5,777,665 A * | 7/1998 | McNelley et al. ......... 348/14.16 |
| 5,953,052 A * | 9/1999 | McNelley et al. ......... 348/14.16 |
| 6,046,849 A | 4/2000 | Moseley et al. |
| 6,055,013 A | 4/2000 | Woodgate et al. |
| 6,055,103 A | 4/2000 | Woodgate et al. |
| 6,243,130 B1 * | 6/2001 | McNelley et al. ............. 725/105 |
| 6,377,295 B1 | 4/2002 | Woodgate et al. |
| 6,437,915 B2 | 8/2002 | Moseley et al. |
| 6,624,863 B1 | 9/2003 | Jacobs et al. |
| 6,663,155 B1 | 12/2003 | Malone et al. |
| 6,710,797 B1 * | 3/2004 | McNelley et al. ......... 348/14.16 |
| 7,425,069 B2 * | 9/2008 | Schwerdtner et al. ............ 353/7 |

(Continued)

FOREIGN PATENT DOCUMENTS

GB    2 238 937 A    6/1991

(Continued)

OTHER PUBLICATIONS

"FPD (Flat Panel Display) Guidebook," Japan Electronics and Information Technology Industries Association (Oct. 2003).

(Continued)

*Primary Examiner* — Moustafa M Meky
(74) *Attorney, Agent, or Firm* — Oliff & Berridge, PLC

(57) ABSTRACT

A display apparatus, frame member, and reflection suppressing member that are capable of achieving an improvement in display quality and an improvement in visibility, are provided. In a case, a reflection suppressing portion that attenuates emitted display light is formed on an annular wall portion (frame portion). The reflection suppressing portion previously suppresses undesirable display (display that is directed to a not-intended direction) which can occur due to the display light emitted from an outer periphery of a display face being reflected by the case and the like.

11 Claims, 17 Drawing Sheets

U.S. PATENT DOCUMENTS

| | | | |
|---|---|---|---|
| 7,633,586 B2* | 12/2009 | Winlow et al. | 349/123 |
| 8,045,069 B2* | 10/2011 | Ijzerman et al. | 349/15 |
| 2002/0080297 A1 | 6/2002 | Sung | |
| 2003/0222833 A1* | 12/2003 | Nakai | 345/1.1 |
| 2004/0119896 A1 | 6/2004 | Kean et al. | |
| 2004/0165060 A1* | 8/2004 | McNelley et al. | 348/14.08 |
| 2004/0254716 A1* | 12/2004 | Ino et al. | 701/200 |
| 2006/0279567 A1* | 12/2006 | Schwerdtner et al. | 345/419 |
| 2007/0018585 A1* | 1/2007 | Ijzerman et al. | 315/15 |

FOREIGN PATENT DOCUMENTS

| | | |
|---|---|---|
| GB | 2 405 546 A | 3/2005 |
| JP | U-55-108465 | 1/1980 |
| JP | A 64-080986 | 3/1989 |
| JP | U-1-139683 | 9/1989 |
| JP | U-3-27179 | 3/1991 |
| JP | U 04-006086 | 1/1992 |
| JP | A 04-146476 | 5/1992 |
| JP | U-5-45710 | 6/1993 |
| JP | A-5-274060 | 10/1993 |
| JP | A 06-186526 | 7/1994 |
| JP | A 06-236152 | 8/1994 |
| JP | A-8-102898 | 4/1996 |
| JP | A-9-37193 | 2/1997 |
| JP | A 09-046622 | 2/1997 |
| JP | A-9-171359 | 6/1997 |
| JP | A 11-073122 | 3/1999 |
| JP | A-11-281968 | 10/1999 |
| JP | A 11-331876 | 11/1999 |
| JP | A 2000-030522 | 1/2000 |
| JP | A 2000-036927 | 2/2000 |
| JP | A 2000-137443 | 5/2000 |
| JP | A-2001-100650 | 4/2001 |
| JP | A 2002-215061 | 7/2002 |
| JP | A-2003-43934 | 2/2003 |
| JP | A 2003-137005 | 5/2003 |
| JP | A-2004-163752 | 6/2004 |
| JP | A 2004-206089 | 7/2004 |
| JP | A 2004-233816 | 8/2004 |
| JP | A 2005-071286 | 3/2005 |
| JP | A 2005-073076 | 3/2005 |
| JP | A 2005-284592 | 10/2005 |
| JP | A-2006-171747 | 6/2006 |
| JP | A-2007-41489 | 2/2007 |
| WO | WO 98/30018 A2 | 7/1998 |
| WO | WO 03/010569 A2 | 2/2003 |
| WO | WO 03/029877 A1 | 4/2003 |
| WO | WO 03/069900 A1 | 8/2003 |
| WO | WO 2004/016460 A1 | 2/2004 |

OTHER PUBLICATIONS

Japanese Office Action issued in Japanese Patent Application No. 2005-249689 on Dec. 7, 2010 (with translation).

Japanese Office Action issued in Japanese Patent Application No. 2005-358189 on Dec. 7, 2010 (with translation).

* cited by examiner

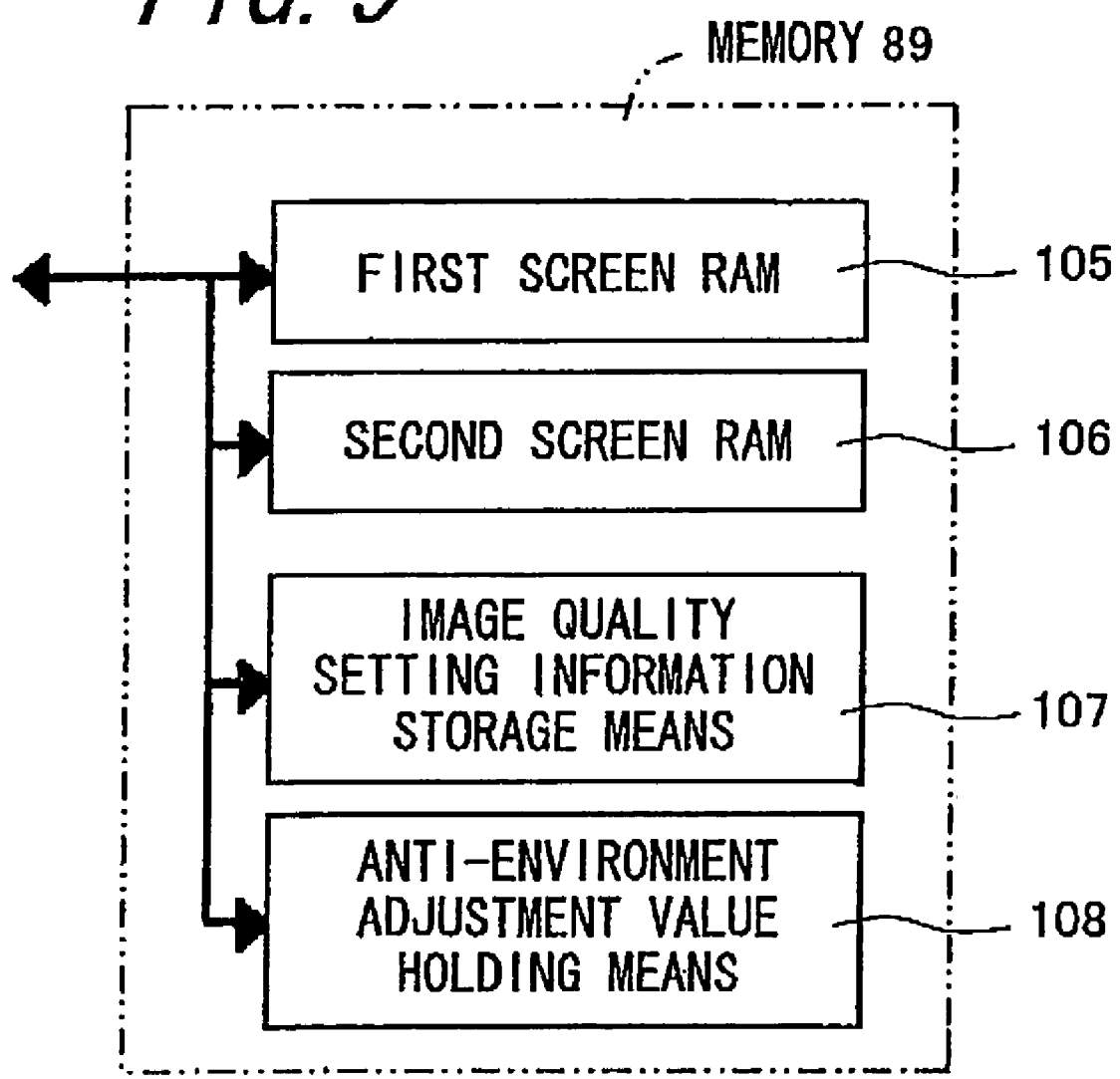

OPERATING PORTION

OPERATING PORTION

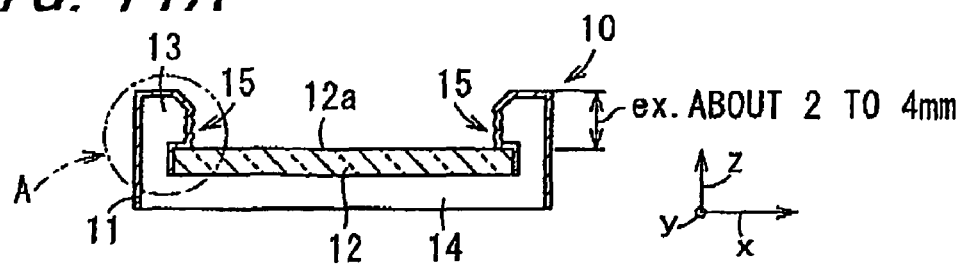
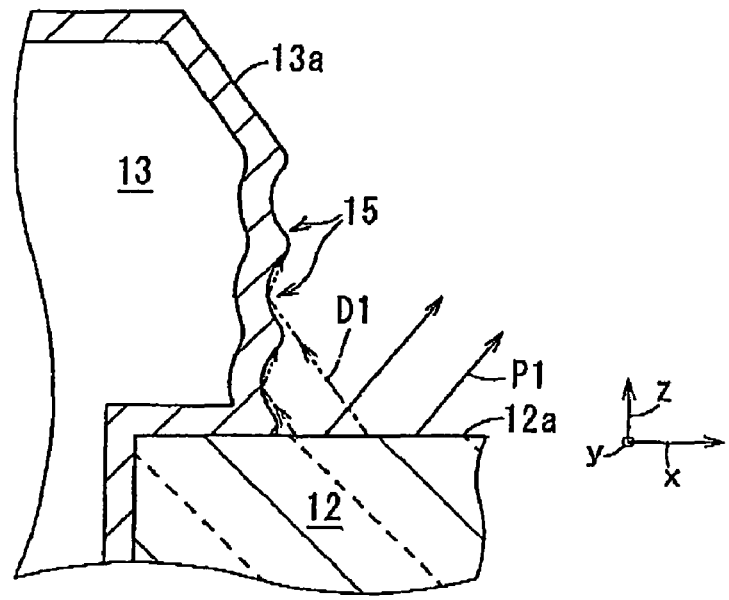
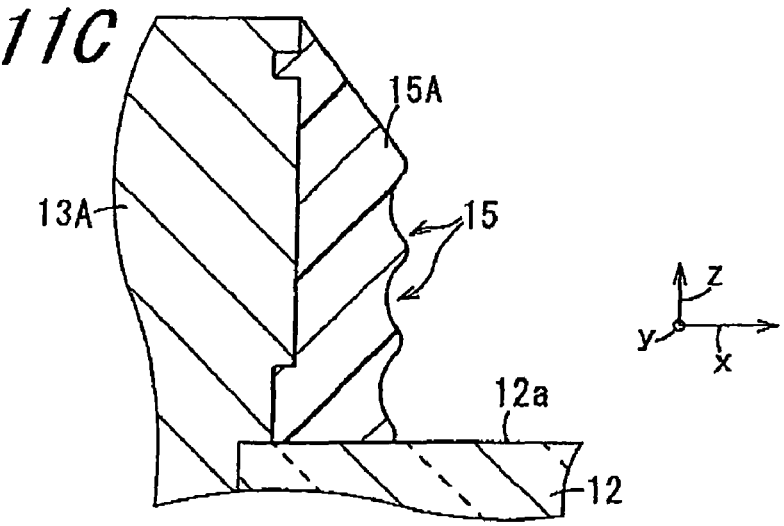

ex. ABOUT 2 TO 4mm ex. ABOUT 2 TO 4mm

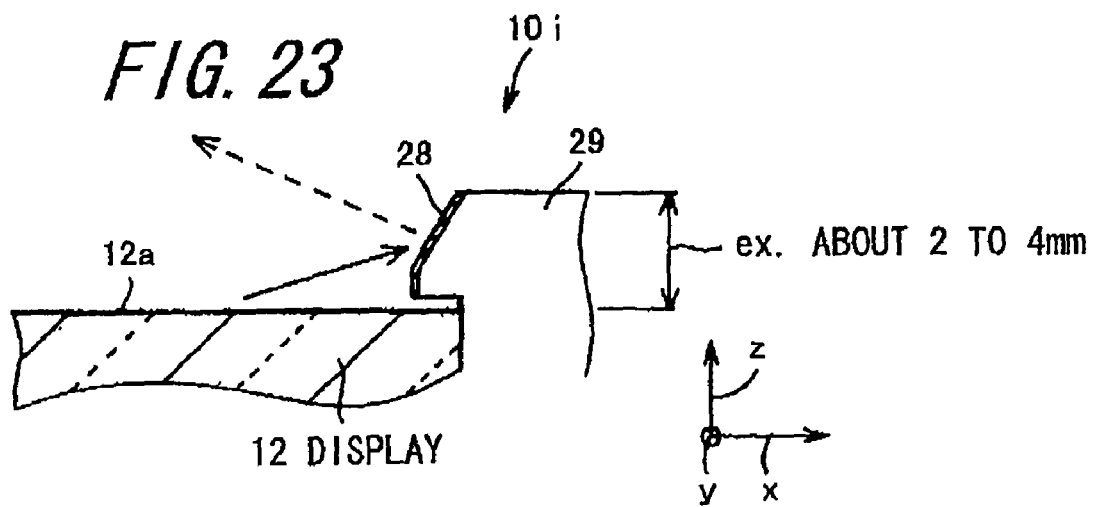
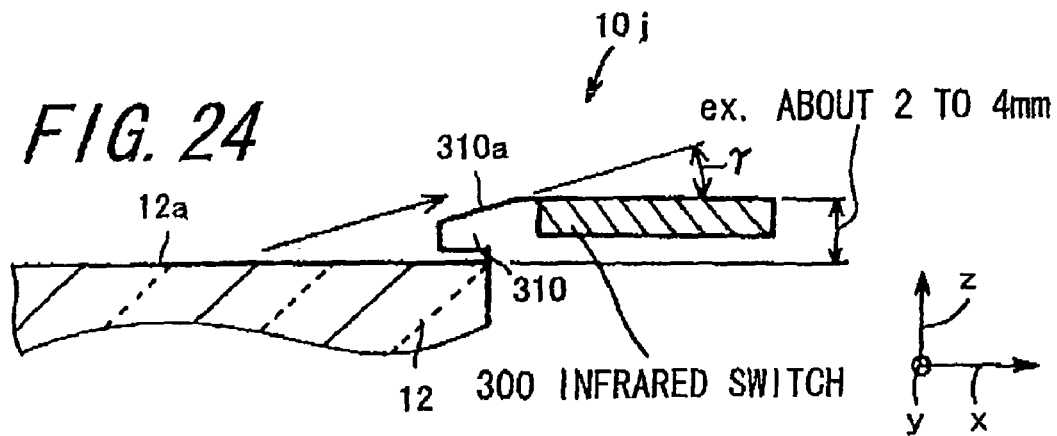

DISPLAY APPARATUS, FRAME MEMBER, AND REFLECTION SUPPRESSING MEMBER

TECHNICAL FIELD

The present invention relates to a display apparatus, a frame member, and a reflection suppressing member, and more specifically relates to a display apparatus having a display unit capable of displaying individual images for a plurality of viewing directions on the same screen, a frame member provided in the display unit, and a reflection suppressing member provided in the frame member.

BACKGROUND ART

Image display apparatuses have been proposed that output respective individual images in different directions on the same display screen (for example, see Japanese Unexamined Patent Publication JP-A2004-206089). When this sort of image display apparatus is for example installed in a vehicle, separate images can be outputted to a driver seat direction and to a passenger seat direction. When viewing the display from the driver seat, the image directed to the passenger seat direction (referred to as a P image) is outputted from the display at such an angle that the image directed to the passenger seat direction cannot be seen normally from the driver seat. When viewing the display from the passenger seat, the image directed to the driver seat direction (referred to as a D image) is outputted at such an angle that the image directed to the driver seat direction cannot be seen normally from the passenger seat.

Specifically, image display apparatuses have been disclosed that are capable of displaying two screens simultaneously with a single liquid crystal display (abbreviated as LCD), and in a vehicle, for example, it is possible to view different screens from the driver seat and from the passenger seat (see Japanese Unexamined Patent Publication JP-A6-186526 (1994) and Japanese Unexamined Patent Publication JP-A 2000-137443). Also, a two screen display apparatus capable of displaying two video images simultaneously on the same screen has been disclosed (see Japanese Unexamined Patent Publication JP-A 11-331876 (1999) and Japanese Unexamined Patent Publication JP-A 9-46622 (1997).

In the conventional art, when, for example, a display is viewed from the driver seat, a portion of the P image may be undesirably visible. Conversely, when the display is viewed from the passenger seat, a portion of the D image may be undesirably visible. The reason for the undesirable visibility is that light emitted from a part of an outer periphery of the display face, as shown in FIG. 22, is reflected by a case wall face 1 disposed near the part of the outer periphery so that the direction in which the light should be outputted is changed, and thus a portion of an image expected to be invisible in the originally non-visible direction is visible. The problem occurs that although each of observers is being allowed to observe an image different from that for the other, the image for the other observer becomes visible, and moreover the images superimposed may be viewed by the observer and thus display quality is reduced.

DISCLOSURE OF INVENTION

An object of the invention is to provide a display apparatus, frame member, and reflection suppressing member that are capable of achieving an improvement in display quality and an improvement in visibility.

The invention provides a display apparatus comprising:

a display unit for displaying individual images in a plurality of viewing directions on a common screen;

a frame portion provided near at least one edge portion of the display unit; and a reflection suppressing portion provided in at least one part of the frame portion, the reflection suppressing portion suppressing an image that should be outputted to one viewing direction from being reflected to another viewing direction at the frame portion.

Also, in the invention, it is preferable that the reflection suppressing portion includes a light-attenuation portion that attenuates display light emitted from the display unit.

Also, in the invention, it is preferable that the reflection suppressing portion includes a reflection angle modification portion that reflects an image that should be outputted in the one direction in a direction other than the other viewing direction.

Also, in the invention, it is preferable that the reflection suppressing portion includes a reflectance reduction portion that reduces the reflectance of display light emitted from the display unit.

Also, in the invention, it is preferable that the reflection suppressing portion includes a reflection prevention portion that causes cancellation of display light emitted from the display unit due to light interference.

Also, in the invention, it is preferable that the reflection suppressing portion includes a light source that diffusely reflects display light emitted from a vicinity of an edge portion of the display unit.

Also, in the invention, it is preferable that the reflection suppressing portion is configured by applying a delustering agent that reduces reflection of display light emitted from the display unit.

Also, the invention provides a display apparatus comprising:

a display unit for displaying individual images in a plurality of viewing directions on a common screen; and a frame portion provided near at least one edge portion of the display unit, wherein the frame portion has such a shape that arrival of display light emitted from the display unit at the frame portion is avoided.

Also, in the invention, it is preferable that the display apparatus further comprises an operating portion provided in the frame portion, and the operating portion is provided at a position where arrival of display light emitted from the display unit at the operating portion is avoided.

Also, in the invention, it is preferable that the frame portion is configured installable to or removable from the display unit.

Also, in the invention, it is preferable that the reflection suppressing portion that suppresses an image that should be outputted in one viewing direction, from being reflected to another viewing direction at the frame portion, is configured installable to or removable from at least one part of the frame portion.

Also, the invention provides a display apparatus comprising:

a display unit for displaying individual images in a plurality of viewing directions on a common screen; and a protrusion amount adjustment portion that adjusts the amount of protrusion of the display unit relative to a portion to which the display unit is installed.

Also, the invention provides a frame member provided near at least one edge portion of a display unit for displaying individual images in a plurality of viewing directions on a common screen, wherein the frame portion is configured installable to or removable from the display unit, and the frame member is provided, in at least one part, with a reflection suppressing portion that suppresses an image that should be outputted in one viewing direction from being reflected to another viewing direction at the frame portion.

Also, the invention provides a reflection suppressing member provided in at least one part of a frame portion provided near at least one edge portion of a display unit for displaying individual images in a plurality of viewing directions on a common screen, wherein the reflection suppressing member is configured installable to or removable from the frame portion, and the reflection suppressing member suppresses an image that should be outputted in one viewing direction, from being reflected to another viewing direction at the frame portion.

BRIEF DESCRIPTION OF DRAWINGS

Other and further objects, features, and advantages of the invention will be more explicit from the following detailed description taken with reference to the drawings wherein:

FIG. 9 is a block diagram schematically showing the configuration of the memory 89;

FIG. 10A is a front view showing a display unit and the like, FIG. 10B is a front view of a multi-view display apparatus in which an operating portion has been provided in a frame portion via a hinge, and FIG. 10C is a front view of a multi-view display apparatus in which an operating portion has been provided integrated with a frame portion;

FIGS. 11A to 11C are cross-sectional views of a multi-view display apparatus, and FIG. 11A is a cross-section view taken along line A-A' in FIGS. 10A to 10C, FIG. 11B is an enlarged view of portion A in FIG. 11A, and FIG. 11C is a view showing a modified state in which the first embodiment has been partially modified;

FIG. 23 is a cross-sectional view taken along line A-A' in FIGS. 10A to 10C;

FIG. 24 is a cross-sectional view taken along line A-A' in FIGS. 10A to 10C;

FIG. 25A is a view showing a state in which the display 12 has been disposed deeper than the surface of an instrument panel 320 of the vehicle, and FIG. 25B is a view showing a state in which the amount of protrusion of the display 12 is the same as the surface of the instrument panel 320.

BEST MODE FOR CARRYING OUT THE INVENTION

Figure 1:
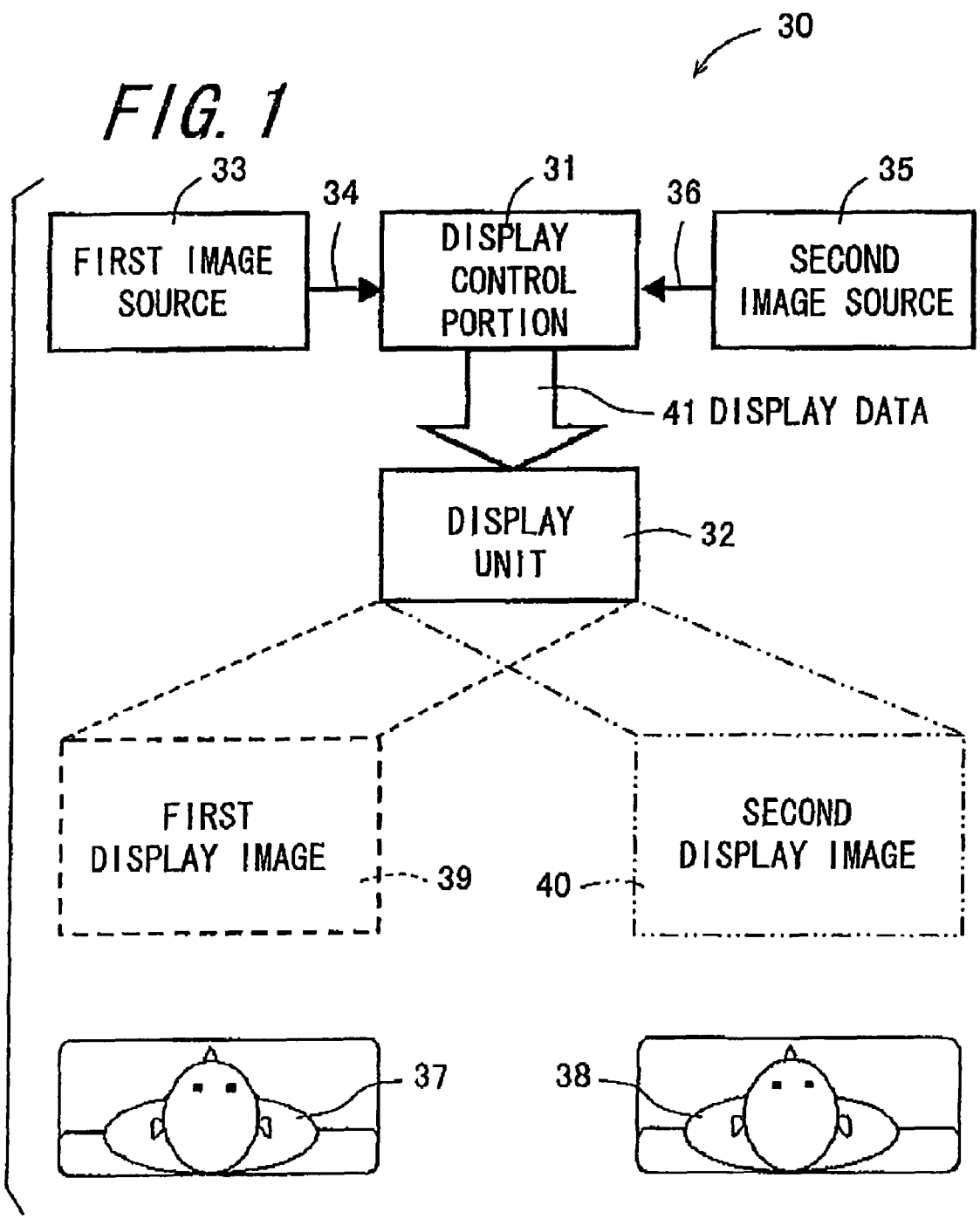
FIG. 1 is a view conceptually showing a multi-view display apparatus 30 according to an embodiment of the invention.

Now referring to the drawings, preferred embodiments of the invention are described below.

Following is a description of a plurality of embodiments for practicing the invention. However, the technological scope of the invention is not limited to those embodiments, and encompasses the invention as indicated in the claims, and equivalents thereof. In each embodiment, the same reference numerals are given to portions corresponding to items described in a prior embodiment, and duplicate descriptions may be omitted. When only a portion of a configuration is described, other parts of the configuration are the same as a configuration described previously. Embodiments may be partially combined with each other, not merely combining the portions specifically described in each embodiment, as long as the combination does not particularly give rise to some problem.

FIG. 1 conceptually shows a multi-view display apparatus 30 according to an embodiment of the invention. The multi-view display apparatus 30 (may also be referred to as simply the "display apparatus" 30) comprises a display control portion 31 (control portion) and a display unit 32. First image data 34 is supplied to the display control portion 31 from a first image source 33, and second image data 36 is supplied to the control portion 31 from a second image source 35, and the first and second image data 34 and 36 is processed such that it is possible to perform substantially simultaneous display with the display unit 32. The first image source 33 is, for example, a video image of a DVD (Digital Versatile Disk) player, a reception image of a television receiver, or the like, and the second image source is, for example, a map, a route guidance image, or the like of a car navigation apparatus.

According to the relative positions of observers 37 and 38 vis-à-vis the display unit 32, in other words according to viewing angles relative to the display unit 32, the observer 37 to one side can view a first display image 39 and the observer 38 to the other side can view a second display image 40 at substantially the same time. The observer 37 to one side can view the first display image 39 in all of the display face of the display unit 32, and in addition the observer 38 to the other side can view the second display image 40 in all of the display face of the display unit 32. The display unit 32, to which display data 41 is supplied from the control portion 31, is configured with a liquid crystal panel or the like provided with a parallax barrier, described below. Half of the total pixels in the long direction (the lateral direction) of the display unit 32 are used for display of the first display image 39 based on the first image source 33. The remaining half of the total pixels are used for display of the second display image 40 based on the second image source 35.

The observer 37 to one side is positioned to one side in the long direction of the display unit 32 and to one side in the thickness direction of the display unit 32. Only the pixels corresponding to the first display image 39 are visible to the observer 37 to one side, and the second display image 40 is obstructed by the parallax barrier formed on the surface of the display unit 32 so that the second display image 40 is substantially not visible to the observer 37. The observer 38 to the other side is positioned to the other side in the long direction of the display unit 32 and to one side in the thickness direction of the display unit 32. Only the pixels corresponding to the second display image 40 are visible to the observer 38 to the other side, and the first display image is obstructed by the parallax barrier so that the second display image 40 is substantially not visible to the observer 38.

Following is a description of the parallax barrier.

For example, in a flat panel-type display, a field region is produced by a combination of the pixel structure of the display and an optical element ordinarily referred to as a parallax lens. One example of such a lens is a parallax barrier. This element is a screen partitioned by an opaque region, in which transmissive slits in the perpendicular direction (vertical direction) are formed. The function of the parallax lens such as a parallax barrier is to limit the exit angle of the light transmitted through a pixel to a predetermined exit angle. This limitation prescribes the viewing angle of each pixel row behind the corresponding slit. The scope of the viewing angle of each pixel is determined by the pixel width and the distance between a flat plane including the pixel and a flat plane including the parallax lens. A plurality of pixel rows corresponding to each slit can be viewed in respective view windows. In the embodiment, this sort of parallax barrier can be applied.

In the overall configuration described above, it is possible to provide different information and content to the observer on one side and the observer on the other side with a single screen. Of course, in a case in which the first and second image sources are the same, the observer on one side and the observer on the other side can view the same image.

Figure 2:
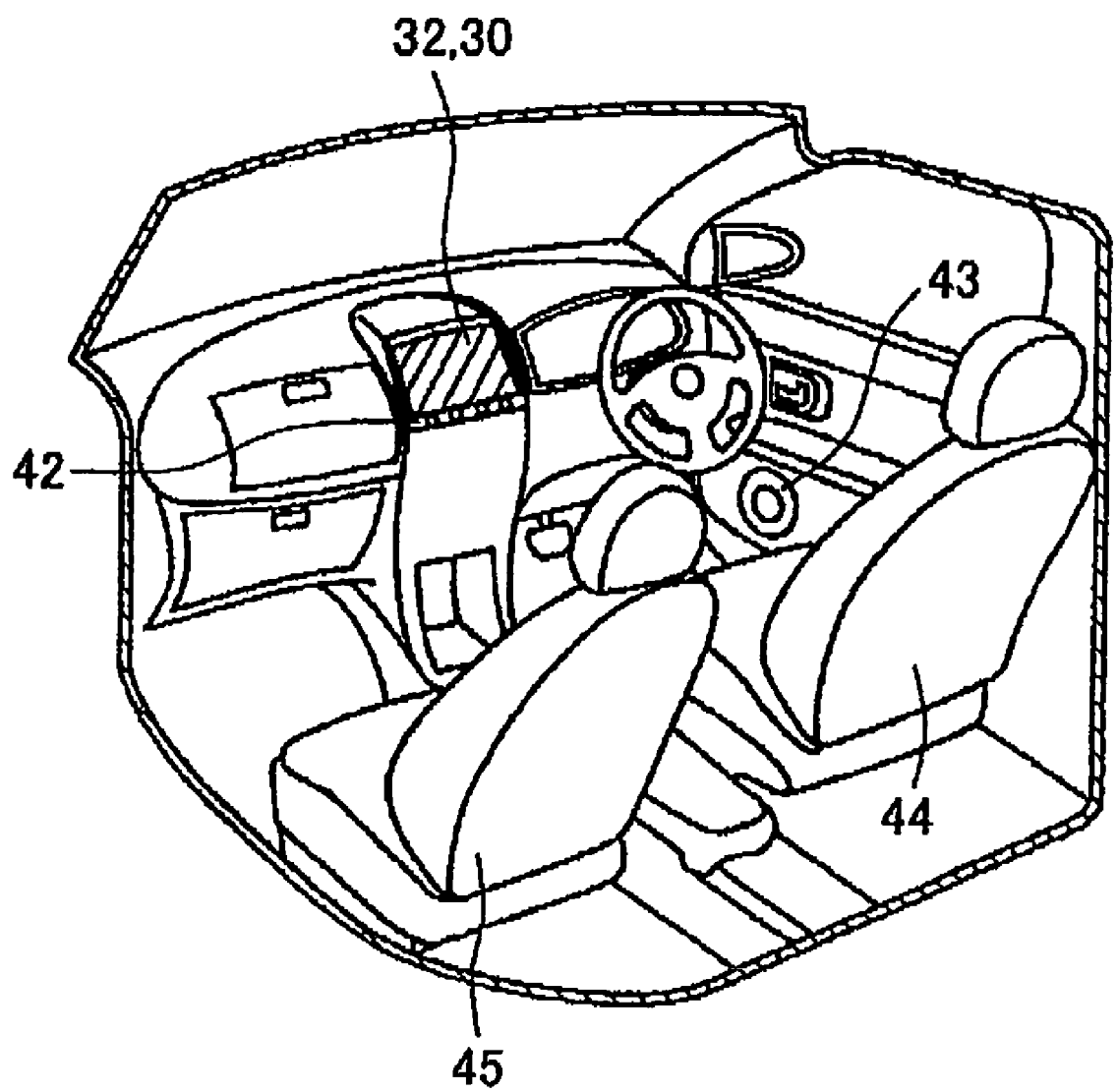
FIG. 2 is a perspective view showing an example in which a multi-view display apparatus according to the embodiment of the invention.

FIG. 2 is a perspective view showing an example in which a multi-view display apparatus according to the embodiment of the invention is installed in a vehicle. The display unit 32 of the multi-view display apparatus is disposed in a vehicle, for example, in a dashboard portion installed near the middle in the widthwise direction of the vehicle. Various operation of the multi-view display apparatus 30 is performed by operation from a touch panel (not shown) provided integrated with the surface of the display unit 32, an operating portion 42, a non-illustrated infrared or wireless remote control, or the like. A speaker 43 is provided in each door of the vehicle, and is configured so as to be capable of outputting audio operating in the display image, warning sounds, or the like.

The observer 38 on the other side is seated in a driver seat 44, and the observer 37 on one side is seated in the passenger seat 45. An image that can be viewed from a first viewing direction (driver seat side) relative to the display unit 32 is, for example, an image such as a map of a car navigation apparatus, and an image that can be viewed from a second viewing direction (passenger seat side) at substantially the same time is, for example, a TV reception image or a DVD movie image.

Accordingly, at the same time that a driver in the driver seat 44 receives driving assistance from the car navigation apparatus, a fellow passenger in the passenger seat 45 can enjoy television or a DVD. Furthermore, because each image is displayed using all of, for example, a seven inch screen, image size is not reduced as in the case of a conventional multi-window display. That is, optimal information and content is provided for the driver and the fellow passenger respectively, as if each had an independent, dedicated display.

Figure 3:
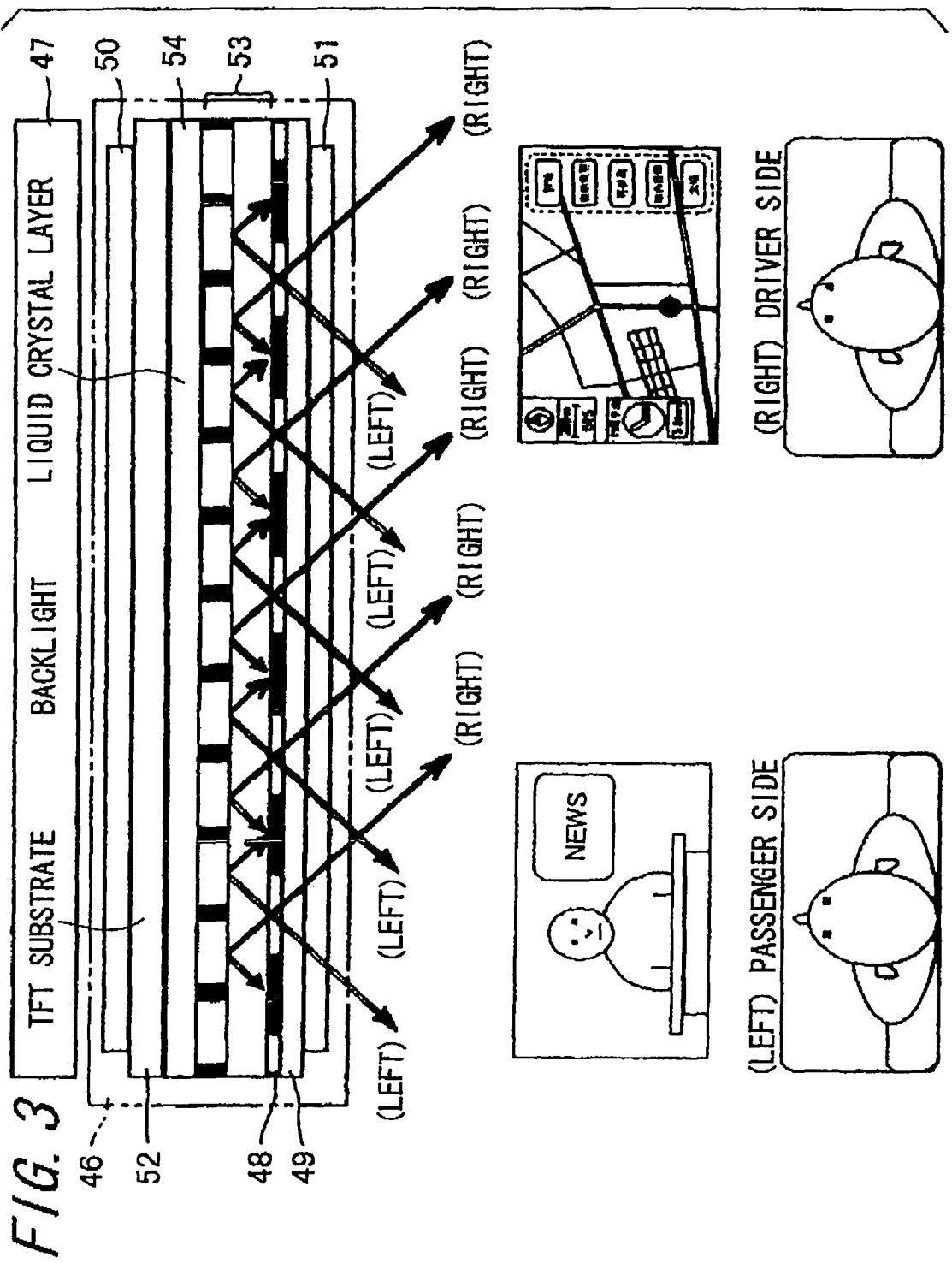
FIG. 3 is a view schematically showing the cross-sectional structure of the display unit 32.

FIG. 3 schematically shows the cross-sectional structure of the display unit 32. The display unit 32 primarily includes a liquid crystal panel 46 and a backlight 47. The liquid crystal panel 46 is configured such that a pair of substrates, a parallax barrier 48 (may also be referred to as a light-shielding portion 48) used as a light-shielding portion and disposed on the front face on the side of the pair of substrates in the direction in which light is emitted, and a glass substrate 49, are sandwiched between two polarizing plates 50 and 51. The pair of substrates is configured such that a liquid crystal layer 54 is sandwiched between a TFT (Thin Film Transistor) substrate 52 and a color filter substrate 53 disposed facing the TFT substrate 52. The liquid crystal panel 46 is provided somewhat separated from the backlight 47. Also, the liquid crystal panel 46 includes pixels for RGB (Red-Green-Blue) colors, i.e., three primary colors.

Display of each pixel of the liquid crystal panel 46 is controlled with the pixels divided into pixels for left side (passenger side) display and pixels for right side (driver side) display. In FIG. 3, the pixels for left side display are indicated with "LEFT", and the pixels for right side display are indicated with "RIGHT". The pixels for left side display are blocked from display to the right side, i.e., the driver seat side, by the parallax barrier 48, and are visible from the left side, i.e., the passenger seat side. The pixels for right side display are blocked from display to the left side, i.e. the passenger seat side, by the parallax barrier 48, and are visible from the right side, i.e., the driver seat side. Thus, it is possible to give map information of the navigation apparatus to the driver, and at the same time allow the fellow passenger to view an image of a DVD or the like.

By modifying the configuration of the pixels of the parallax barrier 48 and the liquid crystal panel 46, a configuration is also possible in which different images are displayed directed to not only the first and second viewing directions, but a plurality of directions such as three directions. The parallax barrier 48 itself may be configured using a liquid crystal shutter or the like that can be electrically powered to vary the viewing angle.

Figure 4:
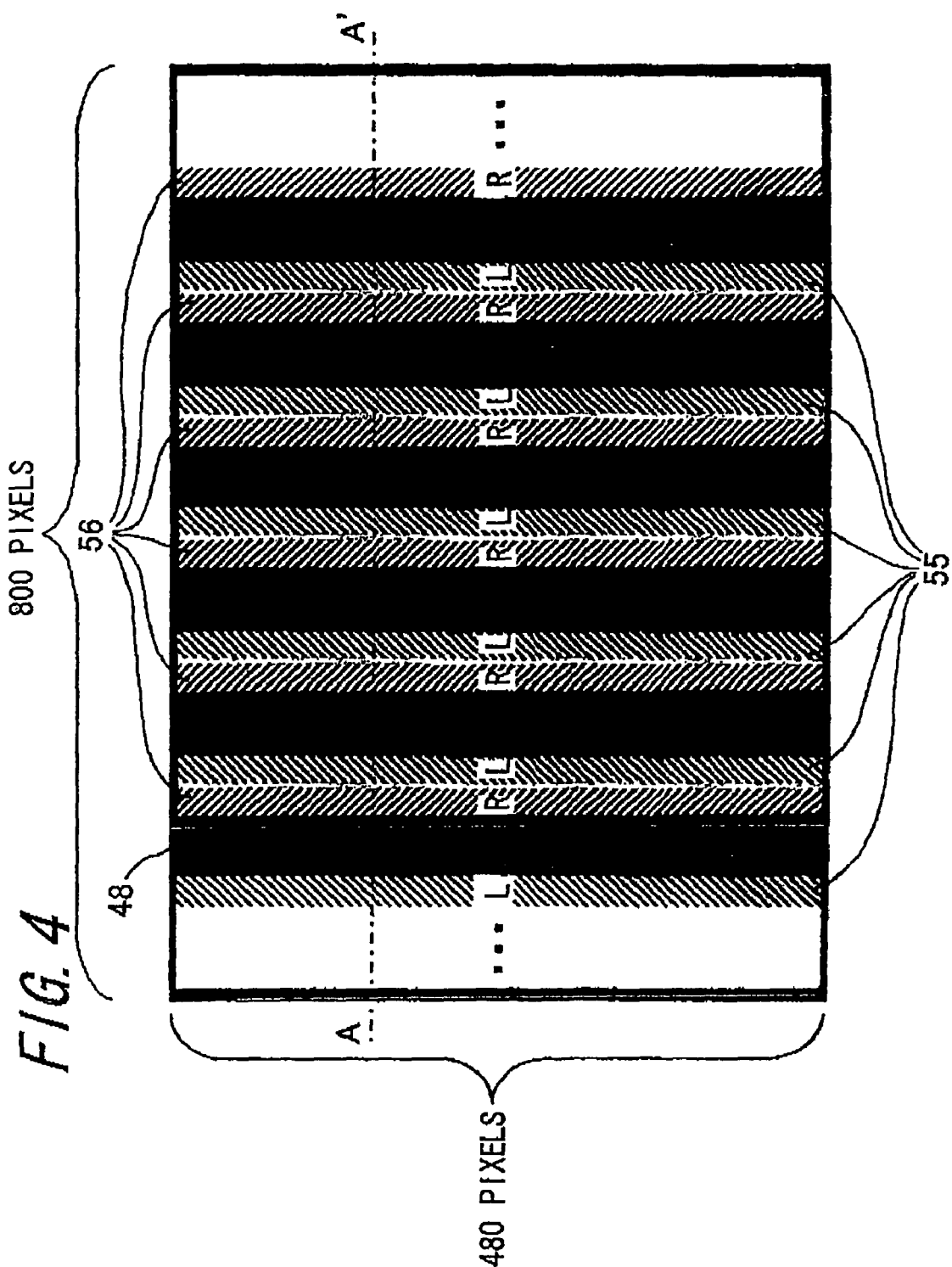
FIG. 4 is a front view showing the positional relationship of left side display pixels 55, right side display pixels 56, and parallax barriers 48.

FIG. 4 is a front view showing the positional relationship of left side display pixels 55, right side display pixels 56, and parallax barriers 48. FIG. 3 is a cross-sectional view taken along line A-A' in FIG. 4. FIGS. 3 and 4 show a portion of the liquid crystal panel 46 in which, for example, 800 pixels are lined up in the long (lateral) direction of the display unit 32, and 480 pixels are lined up in the short (vertical) direction. The left side display pixels 55 and the right side display pixels 56 are grouped in the vertical direction, and lined up alternately in the lateral direction. The parallax barriers 48 are disposed at predetermined intervals in the lateral direction, and provided uniformly in the vertical direction. Thus, when viewing the display unit 32 from the left side, the parallax barrier 48 conceals the right side display pixels 56, and the left side display pixels 55 are visible via transmissive slits in the vertical direction. When viewing the display unit 32 from the right side, the parallax barrier 48 conceals the left side display pixels 55, and the right side display pixels 56 are visible via the transmissive slits in the vertical direction.

When the display unit 32 is viewed from approximately the front, perpendicular to one surface portion of the display unit 32, both the left side display pixels 55 and the right side display pixels 56 are visible, so the left side display image and the right side display image appear substantially stacked. Here, the alternately lined up left side display pixels 55 and the right side display pixels 56 shown in FIG. 4 include the RGB colors as shown in FIG. 3, but in the vertical direction of each group there may be an R line, a G line, and a B line of a single color, or there may be a line in which a plurality of RGB colors are intermingled.

Figure 5:
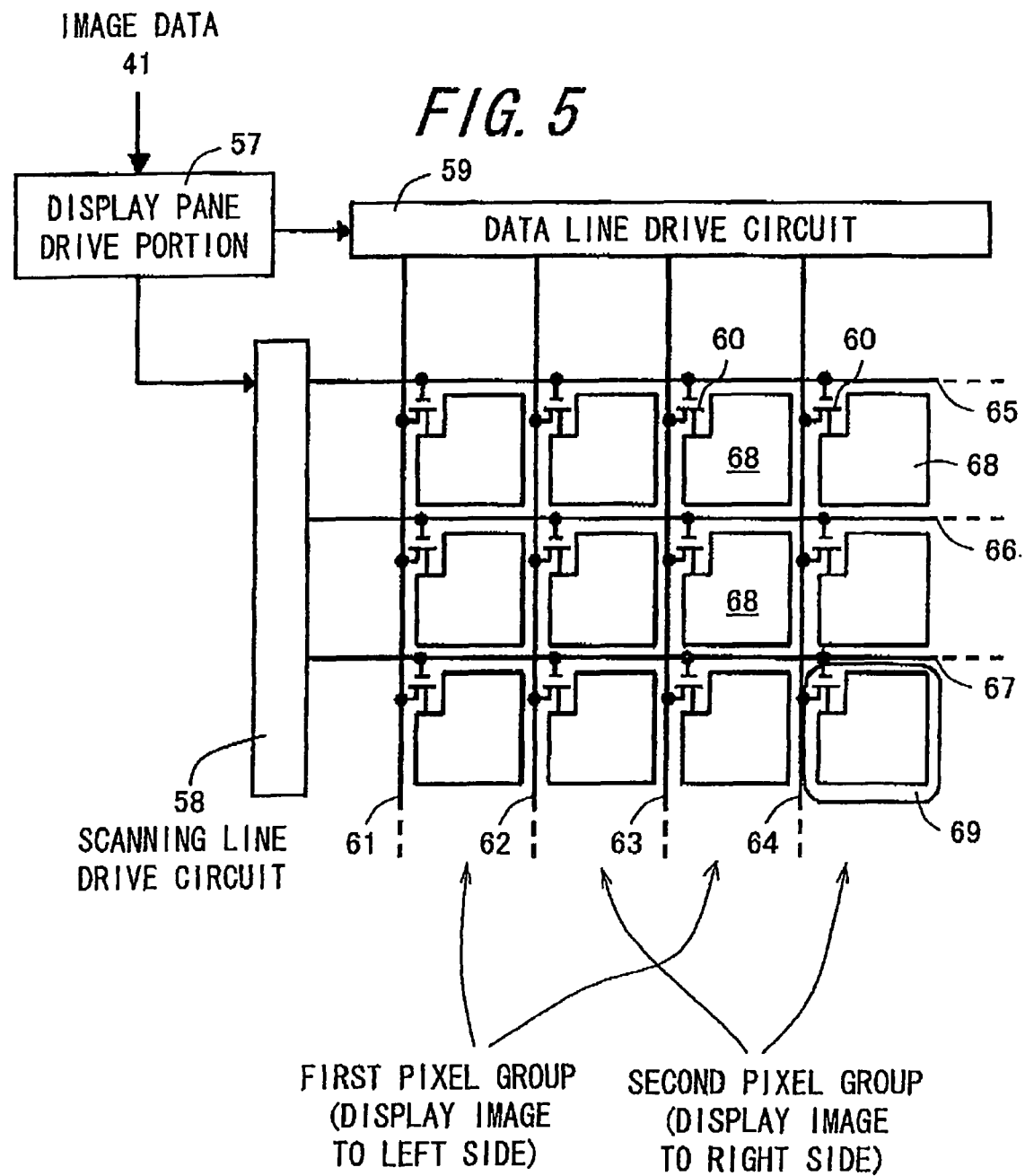
FIG. 5 is a view schematically showing the circuit configuration of the TFT substrate 52.

FIG. 5 schematically shows the circuit configuration of the TFT substrate 52. The TFT substrate 52 includes a display panel drive portion 57, a scanning line drive circuit 58, a data line drive circuit 59, TFT elements 60, data lines 61 to 64, scanning lines 65 to 67, pixel electrodes 68, and subpixels 69. A plurality of the subpixels 69 are formed, with each of regions enclosed by the data lines 61 to 64 and the scanning lines 65 to 67 being one subpixel. In each subpixel 69 is formed a pixel electrode 68, which applies voltage to the liquid crystal layer 54, and a TFT element 60, which performs switching control of the pixel electrode 68. The display panel drive portion 57 controls the drive timing of the scanning line drive circuit 58 and the data line drive circuit 59. The scanning line drive circuit 58 performs selective scanning of the TFT elements 60, and the data line drive circuit 59 controls the voltage applied to the pixel electrodes 68.

In the plurality of subpixels 69, for example, by transmitting first image data (for left side image display) to the data lines 61 and 63, or second image data (for right side image display) to the data lines 62 and 64, based on the combined first and second image data or on the first and second image data individually, a first image data group that displays a first image and a second image data group that displays a second image are formed.

Figure 6:
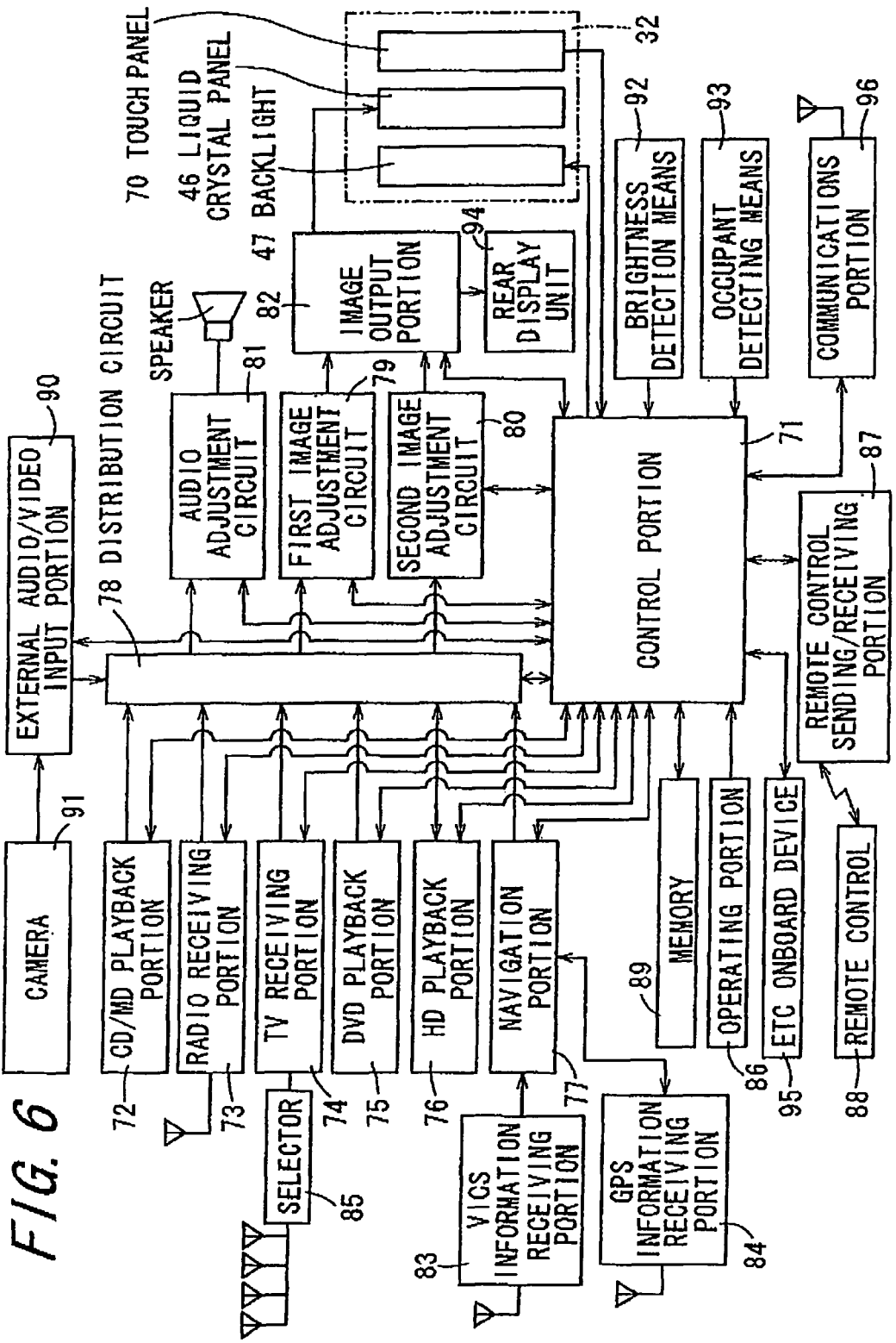
FIG. 6 is a block diagram schematically showing a display apparatus according to an embodiment of the invention.

FIG. 6 is a block diagram that schematically shows a display apparatus according to an embodiment of the invention, and is an example of application to a so-called audio-visual navigation (abbreviated as AVN) multifunctional machine. The AVN multifunctional machine comprises a display unit 32 including a touch panel 70 or the like, a control portion 71, a CD (Compact Disk)/MD (Mini Disk) playback portion 72, a radio receiving portion 73, a TV receiving portion 74, a DVD (Digital Video Disk) playback portion 75, a hard disk (abbreviated as HD) playback portion 76, a navigation portion 77, a distribution circuit 78, a first image adjustment circuit 79, a second image adjustment circuit 80, an audio adjustment circuit 81, an image output portion 82, a VICS information receiving portion 83, a GPS (Global Positioning System) information receiving portion 84, a selector 85, an operating portion 86, a remote control sending/receiving portion 87, a remote control 88, a memory 89, an external audio/video input portion 90, a camera 91, brightness detection means 92, occupant detection means 93, a rear display unit 94, an ETC (Electronic Toll Collection) onboard device 95, and a communications portion 96.

The display unit 32 includes the touch panel 70, the liquid crystal panel 46 and the backlight 47. The liquid crystal panel 46, as described above, is capable of displaying an image viewed from the driver seat side as the first viewing direction and an image viewed from the passenger seat side as the second viewing direction at substantially the same time. Furthermore, a flat panel display other than the liquid crystal panel 46, for example, an organic EL (Electro Luminescence) display, a plasma display panel, a cold cathode flat panel display, or the like, may be used for the display unit 32.

The control portion 71, distributes images or audio from various sources with the distribution circuit 78, to the first image adjustment circuit 79 and the second image adjustment circuit 80 in the case of images, and to the audio adjustment circuit 81 in the case of audio. The various sources are the CD/MD playback portion 72, the radio receiving portion 73, the TV receiving portion 74, the DVD playback portion 75, the HD playback portion 76, and the navigation portion 77. In the first and second image adjustment circuits 79 and 80, luminance, color tone, contrast, and the like are adjusted, and each adjusted image is displayed in the display unit 32 with the image output portion 82. Also, the distribution, volume, and audio to each speaker are adjusted in the audio adjustment circuit 81, and the adjusted audio is outputted from the speakers.

Figure 7:
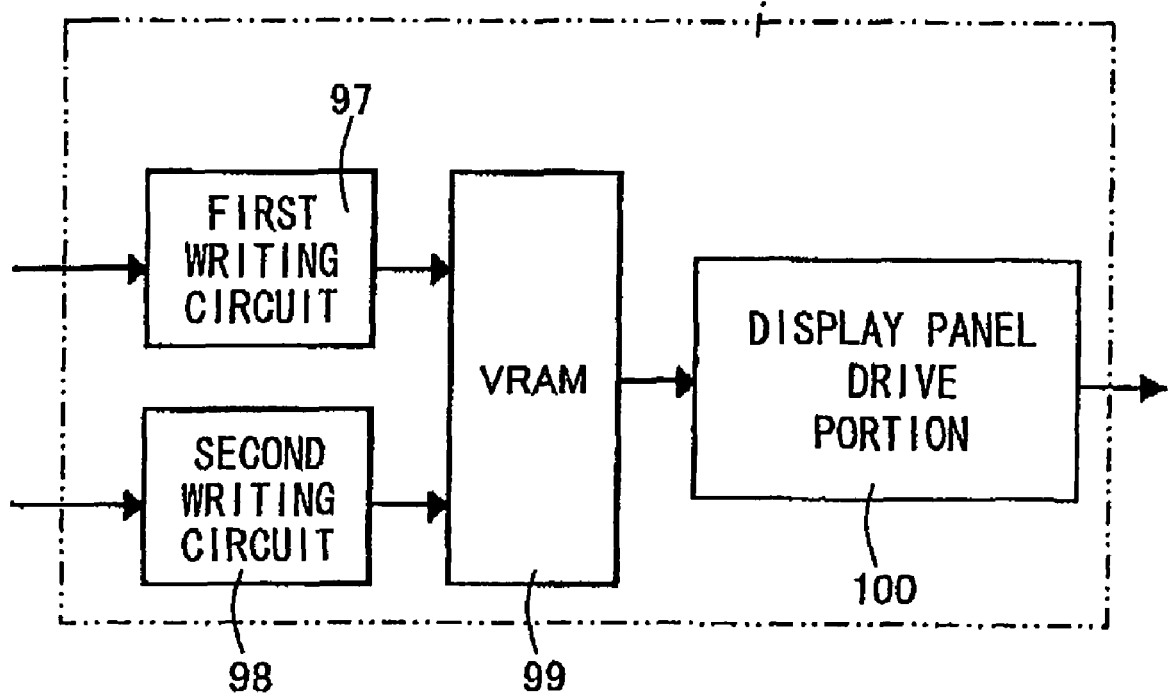
FIG. 7 is a block diagram schematically showing the image output portion 82.

FIG. 7 is a block diagram that schematically shows the image output portion 82. The image output portion 82 comprises, for example, a first writing circuit 97, a second writing circuit 98, a VRAM 99 (Video RAM), and a display panel drive portion 100. For example, the first writing circuit 97 writes, to a corresponding area in the VRAM 99, image data corresponding to odd-numbered lines of the image among the image data adjusted with the first image adjustment circuit 79 (that is, image data of the first display image 8 in FIG. 1), and the second writing circuit 98 writes, to a corresponding area in the VRAM 99, image data corresponding to even-numbered lines of the image among the image data adjusted with the second image adjustment circuit 80 (that is, image data of the second display image 9 in FIG. 1).

The display panel drive portion 100 is a circuit that drives the liquid crystal panel 46, and drives pixels corresponding to the liquid crystal panel 46 based on the image data (the combined first and second image data) saved in the VRAM 99. Image data in which the first and second image data has been combined, is written in the VRAM 99 so as to correspond to an image for multi-view display, so that one drive circuit is sufficient, and the operation of that circuit as well is the same as the operation of a drive circuit of an ordinary liquid crystal display apparatus. As another configuration, it is conceivable to use a first display panel drive circuit and a second display panel drive circuit that drive corresponding pixels of the liquid crystal panel based on the respective image data, without combining the first image data and the second image data. The control portion 71 and the image output portion 82 correspond to a shielding position variable portion.

Following is a description of an example of each source shown in FIG. 6. When the HD playback portion 76 is selected, for example, at least one of music data such as an MP3 (MPEG Audio Layer 3) file, image data such as a JPEG file, and map data for navigation, which are stored in the hard disk, is read, and it is possible to display a menu display for selecting music data or image data on the display unit 32.

The navigation portion 77 comprises a map information storage portion in which map information used for navigation is stored, and is capable of obtaining information from the VICS (Vehicle Information and Communication System) information receiving portion 83 and the GPS information receiving portion 84, and creating and displaying an image for navigation operation. The TV receiving portion 74 receives analog TV broadcast waves and digital TV broadcast waves from an antenna via the selector 85.

Figure 8:
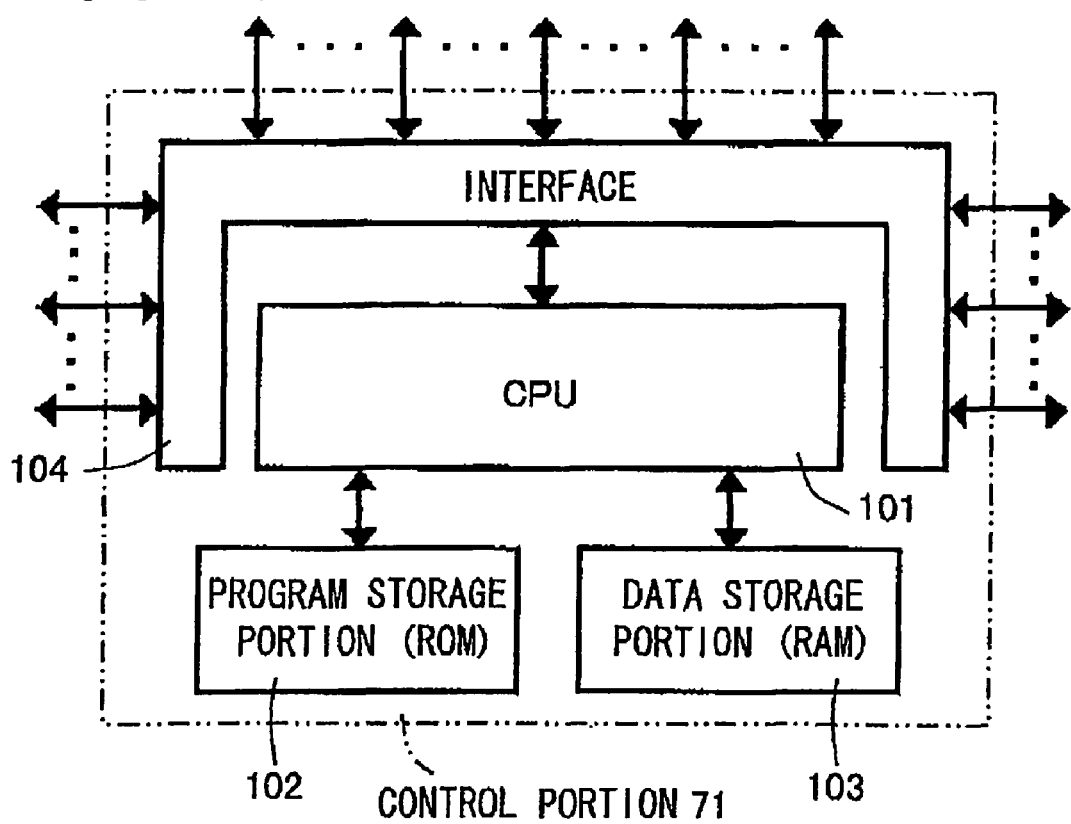
FIG. 8 is a block diagram schematically showing the control portion 71.

FIG. 8 is a block diagram that schematically shows the control portion 71. The control portion 71 controls the distribution circuit 78 and the various sources, and allows the display of two sources or a single source selected. The control portion 71 also has a function to allow display of an operating menu for controlling the various sources in the display unit 32. The control portion 71 is configured with a microprocessor or the like, and primarily includes a CPU (Central Processing Portion) 101, a program storage portion 102, a data storage portion 103, and an input/output interface 104.

The CPU 101 performs central control of each portion and each circuit in the display apparatus 30 via the input/output interface 104. The program storage portion 102 is constituted by a ROM (Read Only Memory) that holds various programs that are necessary for operation of the display apparatus 30. The data storage portion 103 is constituted by a RAM (Random Access Memory) that holds various data. The ROM and RAM may be installed within the CPU or may be provided external to the CPU. It is also possible to use a nonvolatile memory capable of being electrically rewritten, in the manner of flash memory, instead of the ROM.

A user can control the various sources by the touch panel 70 or switches provided around the display unit 32, or an input operation or selection operation such as voice recognition by the operating portion 86. Also, an input or selection operation may be performed with the remote control 88 via the remote control send/receive portion 87. The control portion 71 performs control including the various sources according to operation of the touch panel 70 or the operating portion 86. The control portion 71 is configured so as to be capable of controlling the volume or the like of each of a plurality of speakers 43 (see FIG. 2) provided installed within the vehicle, using the audio adjustment circuit 81. The control portion 71 also allows storage of image quality settings information and various settings information of programs, vehicle information, and the like, in the memory 89.

FIG. 9 is a block diagram that schematically shows the configuration of the memory 89. The memory 89 includes a first and second screen RAM 105 and 106, image quality setting information storage means 107, and environmental adjustment value holding means 108. The first screen RAM 105 is capable of writing an adjustment value of the image quality of the first image set by the user, and the second screen RAM 106 is capable of writing an adjustment value of the image quality of the second image set by the user. In the image quality setting information storage means 107, as preset values that can be read out when adjusting each image quality of the first and second images, adjustment values for a plurality of steps of each image quality adjustment are selectably stored in advance. The environmental adjustment value holding means 108 holds and adjustment state of the image quality of first and second video images for the surrounding environment, for adjusting image quality according to changes in the surrounding environment such as changes in brightness around the AVN multifunctional machine or outside of the vehicle. The image quality setting information storage means 107 and the environmental adjustment value holding means 108 are configured from, for example, a nonvolatile memory that is electrically rewritable such as flash memory, or a volatile memory with battery backup.

As another embodiment of the invention, an image from, for example, the rearview camera 91 connected to the external audio/video input portion 90 may be displayed in the display unit 32. Other than the rearview camera 91, a video camera and a game machine or the like may be electrically connected to the external audio/video input portion 90. The control portion 71 is capable of changing the settings for positioning or the like of output images and audio based on information detected with the brightness detection means 92 and the occupant detection means 93. The brightness detection means 92 is realized with, for example, a light switch or an optical sensor of the vehicle, and the occupant detection means 93 is realized with, for example, a pressure sensor provided in a seat.

The rear display unit 94 is provided for use in a rear seat of the vehicle, and is capable of displaying, via the image output portion 82, the same image displayed in the display unit 32, or either one of an image for the driver seat or an image for the passenger seat. However, the rear display unit 94 may also be configured to display either one of an image for the driver seat or an image for the passenger seat via the distribution circuit 78. The control portion 71 performs control such that it is possible to display a toll, toll history, lane guidance to an ETC gate, and the like from the ETC onboard device 95. The control portion 71 controls a communications portion for wirelessly connecting to a mobile phone handset or the like, and may allow a display related to this connection.

Figure 10A:
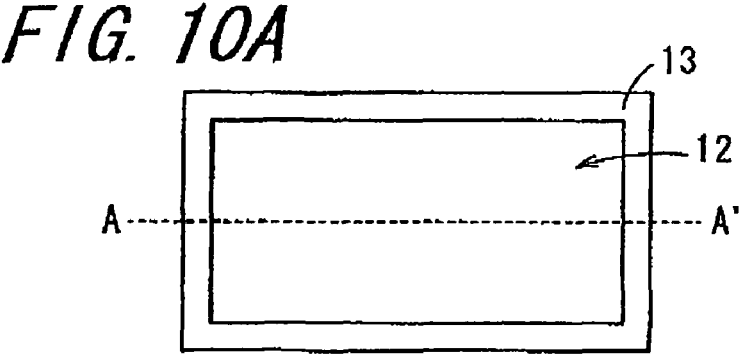
FIGS. 10A to 10C are front views of a multi-view display apparatus according to an embodiment of the invention.
Figure 10B:
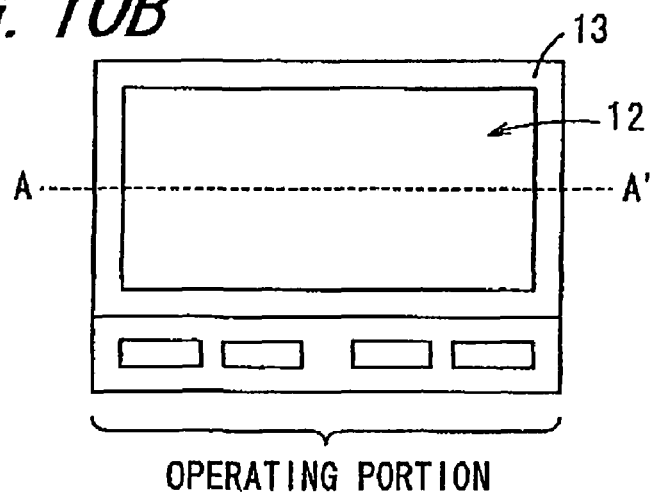
Figure 10C:
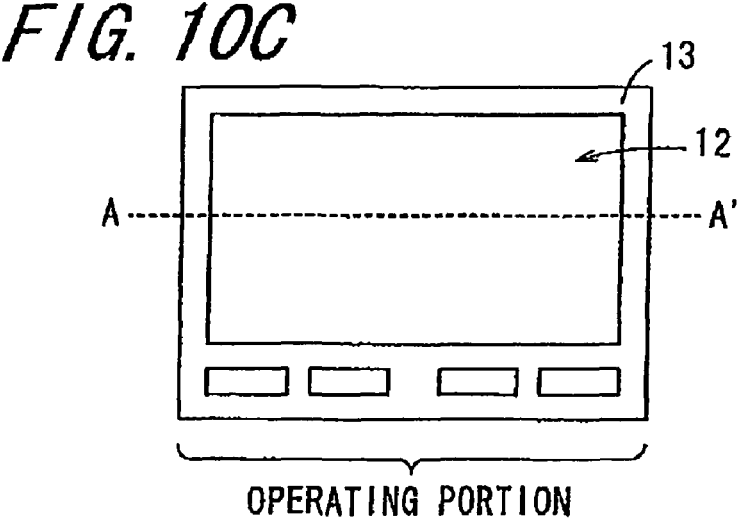

FIGS. 10A to 10C are front views of a multi-view display apparatus according to an embodiment of the invention. FIG. 10A is a front view showing a display unit and the like, FIG. 10B is a front view of a multi-view display apparatus in which an operating portion has been provided in a frame portion via a hinge, and FIG. 10C is a front view of a multi-view display apparatus in which an operating portion has been provided integrated with a frame portion.

FIGS. 11A to 11C are cross-sectional views of a multi-view display apparatus. FIG. 11A shows a cross-section taken along line A-A' in FIGS. 10A to 10C, FIG. 11B is an enlarged view of portion A in FIG. 11A, and FIG. 11C shows a modified state in which the first embodiment has been partially modified. A multi-view display apparatus 10 according to this embodiment is installed in a vehicle. However, the multi-view display apparatus 10 is not limited to use only in a vehicle, and is also applicable to an electronic device not used in a vehicle.

The multi-view display apparatus 10 according to the first embodiment (referred to as the first multi-view display apparatus 10) includes a case 11 and a display main body 12 (may also be referred to as simply the display 12) supported by the case 11. The display main body 12 serving as display means (a display unit) is realized with, for example, a liquid crystal display panel, a touch panel, a light-shielding panel, a backlight, a polarizing plate or the like. The case 11, for example, is made of a synthetic resin and has a shape of an approximately rectangular parallelepiped. However, the case 11 is not necessarily limited to a synthetic resin, and may also be made of a non-metal other than a synthetic resin or of a metal. Also, the case 11 is not necessarily limited to having the shape of an approximately rectangular parallelepiped. In the case 11, an opening portion is formed that exposes a large part of a surface portion 12a (display face 12a) of the display main body 12 to the outside. Here, the long direction of the case 11 is defined as an x direction, and the depthwise direction of the case 11, i.e. the thickness direction of the display main body 12, is defined as a z direction. A direction perpendicular to the x direction and the z direction is defined as a y direction. In FIGS. 11A to 11C, the x, y and z directions are indicated by x, y and z, respectively. In a state in which, in the z direction of the first display apparatus 10, a driver to one side in the x direction is seated apart from an occupant to the other side in the x direction, an image outputted from the display 12 is visible.

As shown in FIG. 11A, the case 11 comprises an annular wall portion 13 that forms the opening portion, and a rear face wall portion 14 that covers a rear face portion (non-displaying face) of the display main body 12, and the annular wall portion 13 and the rear face wall portion 14 are formed as a single body. In the case 11, a plurality of concaves and convexes 15 are formed in the annular wall portion 13 (frame portion) as suppressing means (a reflection suppressing portion). The annular wall portion 13 corresponds to a "frame portion", and the plurality of concaves and convexes 15 correspond to a reflection suppressing portion. The concaves and convexes 15 may also be referred to as "embosses". The plurality of concaves and convexes 15 are formed facing one side and the other in the x direction, and formed facing one side and the other in the y direction. That is, in the annular wall portion 13, a plurality of the concaves and convexes 15 are formed near the outer periphery of the display face 12a and in a yz plane and an xz plane facing outside. Also, the amount of protrusion in the z direction of the frame portion is designed to be, for example, in a range of approximately 2 mm to approximately 4 mm. The plurality of concaves and convexes 15 have the same form in each plane, so that the concaves and convexes 15 formed in the yz plane to one side in the x direction will be described, and a description of the concaves and convexes 15 formed in the other plane will be omitted.

In this embodiment, a plurality of the concaves and convexes 15 are formed in the yz plane and the xz plane of the annular wall portion 13, but the invention is not necessarily limited to this embodiment. For example, a plurality of the concaves and convexes 15 may by formed in only the yz plane of the annular wall portion 13. However, in a case in which the supporting embodiment of the first display apparatus 10 is modified so that a viewer is present on one side and on the other side in the y direction of the first display apparatus, a plurality of the concaves and convexes 15 may be formed in only the xz plane. It is not necessary that the frame portion and the reflection suppressing portion are provided near the entire peripheral edge portion of the display unit as shown in FIGS. 11A to 11C, and they may be provided near at least one edge portion of the display unit corresponding to a location where suppression of reflection of display light outputted from the display face 12a is desired. The frame portion can be configured to be installable to or removable from the display unit. As shown in FIG. 11B, the plurality of concaves and convexes 15 are continuously linked in the z direction, and among the concaves and convexes 15, the concaves are formed curved to be concave to one side in the x direction, and the convexes are formed so as to protrude a predetermined short distance to the other side in the x direction. In the annular wall portion 13 of the case 11, a sloping portion 13a is formed to one side in the x direction, the sloping portion 13a sloping from a convex at the side of the tip end in the z direction toward one side in the z direction.

The display light emitted in the driver seat direction from the outer periphery of the display face 12a, indicated by arrow D1, is reflected by the inside of the concaves and thus attenuated. Further, although not shown, the display light emitted to the passenger seat direction from the outer periphery of the display face 12a, indicated by arrow P1, is reflected by the inside of the concaves in the yz plane to the other side in the x direction, and thus attenuated. That is, the plurality of concaves and convexes 15 correspond to light attenuation means (a light attenuation portion).

According to the first display apparatus 10 described above, with a plurality of the concaves and convexes 15, it is possible to suppress undesired display (display that is directed to a not-intended direction) that can occur due to the display light emitted from the outer periphery of the display face 12a being reflected by the case 11 and the like, so that it is possible to maintain display quality and improve visibility. Also, as shown in FIG. 11C, a configuration may be adopted in which a member (part) 15A including the plurality of concaves and convexes 15 of the annular wall portion 13 is installable to or removable from a case main body 13A. According to this modified embodiment, assembly work becomes easy, and installation can be unconstrained. Also, the die structure of the case 13A can be simplified in comparison to the die structure in the first display apparatus 10 described above, so that it is possible to achieve further reduced manufacturing costs.

Figure 12:
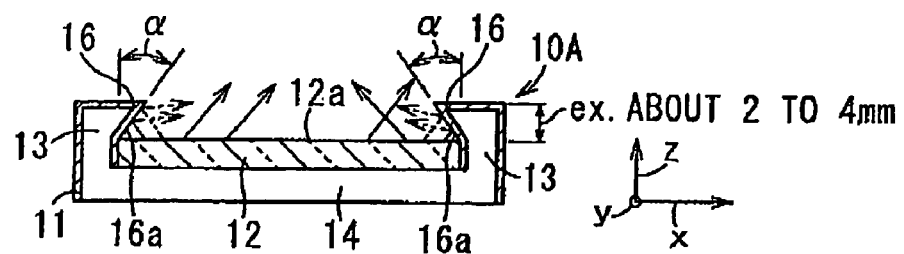
FIG. 12 is a cross-sectional view taken along line A-A' in FIGS. 10A to 10C.

FIG. 12 is a cross-sectional view taken along line A-A' in FIGS. 10A to 10C. In a multi-view display apparatus 10A according to a second embodiment (referred to as the second multi-view display apparatus 10A), reflection angle modification means (a reflection angle modification portion) 16 is provided integrated with the annular wall portion 13 of the case 11. The reflection angle modification portion 16 reflects an image that should be outputted in the driver seat direction, to a direction other than the passenger seat direction, and reflects an image that should be outputted to the passenger seat direction, to a direction other than the driver seat direction. The reflection angle modification portion 16 is provided in the annular wall portion 13 near the outer periphery of the display face 12a in the yz plane and the xz plane facing outside. Also, the amount of protrusion in the z direction of the frame portion from the display face 12a as a reference is designed to be, for example, in a range of approximately 2 mm to approximately 4 mm. In the reflection angle modification portion 16, a sloped face portion 16a with a slope angle $\alpha$ is provided so as to slope to the center of the display face 12a from the base end in the z direction of the reflection angle modification portion 16 toward the tip. By setting the slope angle $\alpha$ of the sloped face portion 16a to an appropriate angle ($\alpha$ being 45 degrees, for example), it is possible to suppress, before occurring, undesired display (display that is directed to a not-intended direction) that can occur due to the display light emitted from the outer periphery of the display face 12a being reflected by the case 11 and the like. However, the slope angle $\alpha$ is not limited to being 45 degrees. In the second display apparatus 10A, a configuration may be adopted in which, as shown in FIG. 11C, the reflection angle modification portion 16 is installable to or removable from the case main body. It is also possible to configure the frame portion including the reflection angle modification portion 16 to be installable to or removable from the display unit. Further, it is not necessary for the frame portion and the reflection angle modification means to be installed near the entire peripheral edge portion of the display unit, and they may be provided near at least one edge portion of the display unit corresponding to a location where suppression of reflection of display light outputted from the display face 12a is desired.

According to the second display apparatus 10A described above, by forcibly reflecting the display light emitted from the vicinity of the outer periphery of the display face 12a in a desired direction with the reflection angle modification portion 16, it is possible to not fix but to expand a range of the position and direction in which the reflected display light is visible. In this manner it is possible for the direction in which the display light is outputted to be unconstrained.

Otherwise, the same effects as the first display apparatus 10 are attained. The reflection angle modification portion 16 may be configured installable to or removable from the case main body. In this case, the same effects as in the above modified embodiment are attained.

Figure 13:
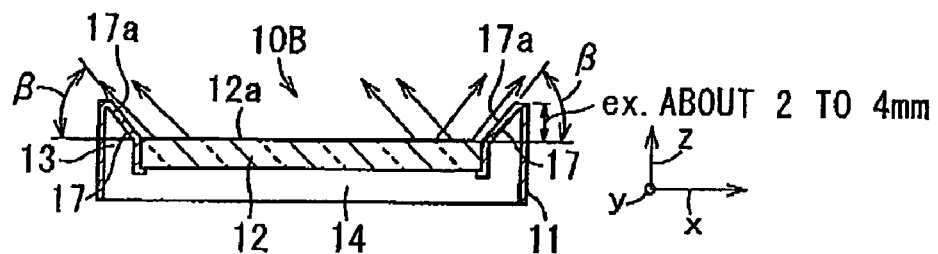
FIG. 13 is a cross-sectional view taken along line A-A' in FIGS. 10A to 10C.

FIG. 13 is a cross-sectional view taken along line A-A' in FIGS. 10A to 10C. In a multi-view display apparatus 10B according to a third embodiment (referred to as a third display apparatus 10B), suppressing means (a reflection suppressing portion) 17 is provided integrated with the annular wall portion 13 of the case 11. The reflection suppressing portion 17 is formed based on the light output direction of the display light emitted from the vicinity of the outer periphery of the display face 12a. That is, the case 11 is designed such that the emitted display light is neither incident on the reflection suppressing portion 17 nor reflected. The amount of protrusion in the z direction of the frame portion from the display face 12a as a reference is designed to be, for example, in a range of approximately 2 mm to approximately 4 mm.

Specifically, in the reflection suppressing portion 17, a sloped face portion 17a with a slope angle β is provided so as to slope to the outside in the x direction from the base end in the z direction of the reflection suppressing portion 17 toward the tip in the z direction. By setting the slope angle β of the sloped face portion 17a to an appropriate angle (β being not more than 50 degrees, for example), it is possible to suppress, before occurring, undesired display (display that is directed to a not-intended direction) that can occur due to the display light emitted from the outer periphery of the display face 12a being reflected by the case 11 and the like. However, the slope angle β is not limited to being not more than 50 degrees. Moreover, with the third display apparatus 10B, the display light emitted from the vicinity of the outer periphery of the display face 12a may be reflected at the reflection suppressing portion 17 within a range that does not affect maintenance of display quality and improvement of visibility. In the third display apparatus 10B, as shown in FIG. 11C, a configuration may also be adopted in which the reflection suppressing portion 17 is installable to or removable from the case main body. A configuration is also possible in which the frame portion including the reflection suppressing portion 17 is installable to or removable from the display unit, It is not necessary that the frame portion and the reflection suppressing portion are provided near the entire peripheral edge portion of the display unit, and they may be provided near at least one edge portion of the display unit corresponding to a location where suppression of reflection of display light outputted from the display face 12a is desired.

Figure 14:
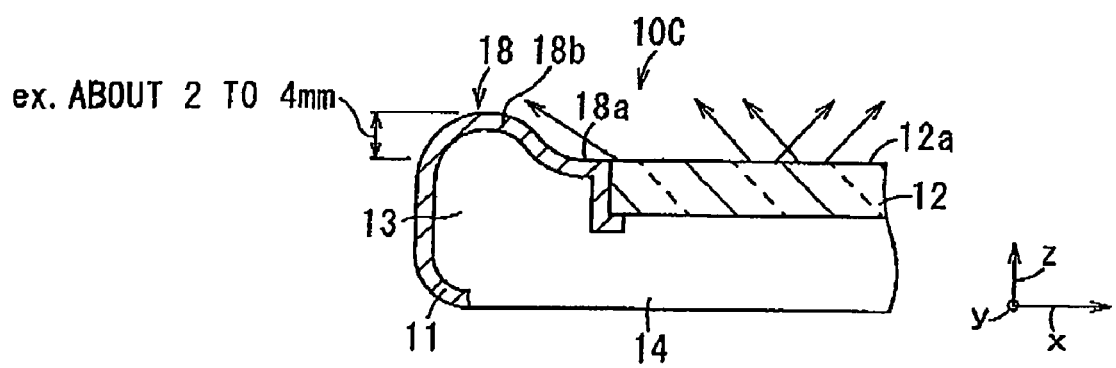
FIG. 14 is a cross-sectional view taken along line A-A' in FIGS. 10A to 10C.

FIG. 14 is a cross-sectional view taken along line A-A' in FIGS. 10A to 10C. In a multi-view display apparatus 10C according to a fourth embodiment (referred to as a fourth display apparatus 10C) as well, the case 11 is designed such that the display light emitted from the vicinity of the outer periphery of the display face 12a is neither incident on suppressing means (a reflection suppressing portion) 18 nor reflected. The reflection suppressing portion 18 includes a flat portion 18a and a protruding portion 18b. Of these, the flat portion 18a is formed near the outer periphery of the display face 12a in the annular wall portion 13, and is formed approximately flush with the display face and flat for a predetermined distance. The protruding portion 18b is formed continuous with the tip end portion of the flat portion 18a. The protruding portion 18b forms a curved convex portion that gradually (smoothly) slopes to the outside in the x direction from the tip end portion of the flat portion 18a to the side of the tip end in the z direction. The amount of protrusion of the frame portion in the z direction from the display face 12a as a reference is designed to be for example, in a range of approximately 2 mm to approximately 4 mm. With such a reflection suppressing portion 18, it is possible to suppress, before occurring, undesired display (display that is directed to a not-intended direction) that can occur due to the display light emitted from the outer periphery of the display face 12a being reflected by the case 11 and the like. In the fourth display apparatus 10C, as shown in FIG. 11C, the reflection suppressing portion 18 may be configured installable to or removable from the case main body. The frame portion including the reflection suppressing portion 18 may be configured installable to or removable from the display unit. It is not necessary that the frame portion and the reflection suppressing portion are provided near the entire peripheral edge portion of the display unit, and they may be provided near at least one edge portion of the display unit corresponding to a location where suppression of reflection of display light outputted from the display face 12a is desired.

Figure 15:
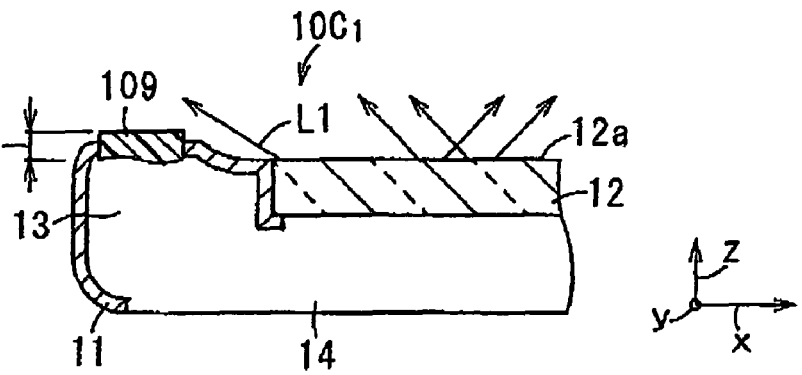
FIG. 15 is a cross-sectional view taken along line A-A' in FIGS. 10A to 10C.

FIG. 15 is a cross-sectional view taken along line A-A' in FIGS. 10A to 10C. In a multi-view display apparatus $10C_1$ according to this embodiment (referred to as a display apparatus $10C_1$), an operating button 109 is provided in the annular wall portion 13 used as the frame portion. The amount of protrusion of the operating button 109 in the z direction from the display face 12a as a reference is designed to be, for example, in a range of approximately 2 mm to approximately 4 mm. The operating button 109 is provided at a position where arrival of the display light (indicated by L1) emitted from the vicinity of the outer periphery of the display face 12a at the operating button is avoided. The operating button 109 corresponds to an operating portion.

In this manner, according to the display apparatus $10C_1$, by disposing the operating button 109, it is possible to suppress, before occurring, undesired display that can occur due to the display light L1 emitted from the vicinity of the outer periphery of the display face 12a being reflected by the operating button 109. Moreover, with the display apparatus $10C_1$, the display light L1 emitted from the vicinity of the outer periphery of the display face 12a may be slightly reflected at the operating button 109 within a range that does not affect maintenance of display quality and improvement of visibility. Even such slight reflection may be eliminated by, for example, forming the operating button 109 with transmissive material. That is, a configuration is possible in which the display light L1 emitted from the vicinity of the outer periphery of the display face 12a is allowed to pass into the operating button 109 and thus not reflected at the operating button 109.

It is not necessary that the operating button 109 is provided at a position where arrival of the display light L1 emitted from the vicinity of the outer periphery of the display face 12a at the entire peripheral edge portion of the display unit at the operating button is avoided. A configuration is acceptable in which an operating button position that is near at least one edge portion of the display unit corresponding to a location where suppression of reflection of display light outputted from the display face 12a is desired, is provided at a position where arrival of the display light L1 emitted from the vicinity of the outer periphery of the display face 12a at the operating button is avoided.

Further, it is possible to adopt a configuration in which, by disposing the operating button 109 at other than a location where suppression of reflection of display light outputted from the display face 12a is desired, the display light is not reflected by the operating button 109.

Figure 16A:
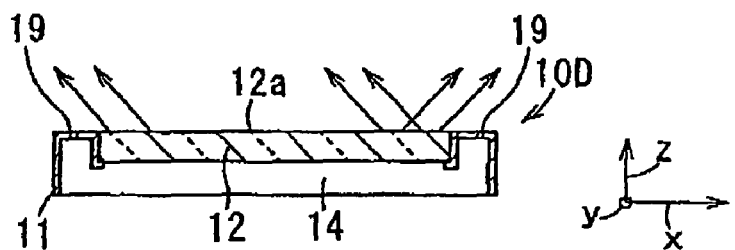
FIGS. 16A to 16B are cross-sectional views taken along line A-A' in FIGS. 10A to 10C.
Figure 16B:
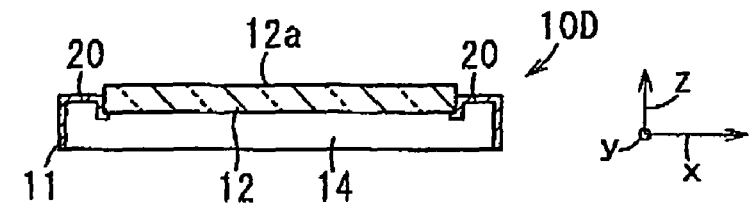

FIGS. 16A to 16B are cross-sectional views taken along line A-A' in FIGS. 10A to 10C. In this fifth embodiment, the suppressing means (reflection suppressing portion) is the case 11, which includes a frame portion 19 (20) of the display main body 12, and the case is configured so that arrival of an image outputted from the display main body 12 at a surrounding member 19 (20), i.e., the frame portion is avoided. It is not necessary that the reflection suppressing portion is provided near the entire peripheral edge portion of the display unit, and the reflection suppressing portion may be provided near at least one edge portion of the display unit corresponding to a location where suppression of reflection of display light outputted from the display face 12a is desired.

Figure 17:
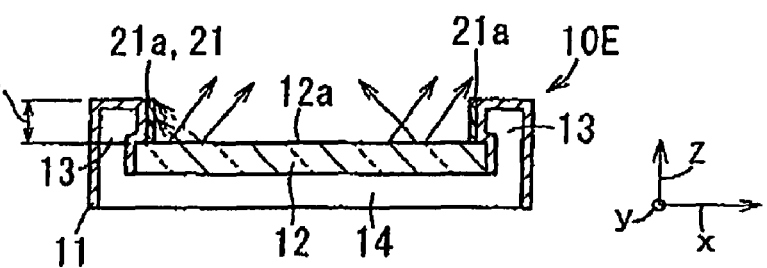
FIG. 17 is a cross-sectional view taken along line A-A' in FIGS. 10A to 10C.

FIG. 17 is a cross-sectional view taken along line A-A' in FIGS. 10A to 10C. A multi-view display apparatus 10E according to a sixth embodiment of the invention includes, for example, suppressing means (a reflection suppressing portion) 21, which includes a layer 21a that reduces the light reflectance. In the sixth embodiment, with the layer 21a that reduces the light reflectance and is provided in the surrounding member (frame portion), it is possible to prevent, as much as possible, the display light emitted from the display face 12a from being reflected by the frame portion. Also, the amount of protrusion of the frame portion in the z direction from the display face 12a as a reference is designed to be for example, in a range of approximately 2 mm to approximately 4 mm. Changes in the direction in which the display light should be outputted can be prevented, thus eliminating a problem in which a portion of an image expected to be invisible in the originally non-visible direction is visible. A configuration may be adopted in which a reflection prevention film is provided in the frame portion instead of the layer 21a that reduces the light reflectance, and with the reflection prevention film, the display light emitted from the vicinity of the outer periphery of the display face 12a is cancelled due to light interference. The same effects are also attained with this configuration. It is not necessary that the annular wall portion 13 used as the frame portion and the reflection suppressing portion 21 are provided near the entire peripheral edge portion of the display unit, and they may be provided near at least one edge portion of the display unit corresponding to a location where suppression of reflection of display light outputted from the display face 12a is desired. In the sixth display apparatus 10E, a configuration may be adopted in which, as shown in FIG. 11C, the reflection suppressing portion 21 is installable to or removable from the case main body. It is also possible to configure the frame portion including the reflection suppressing portion 21 to be installable to or removable from the display unit.

Figure 18:
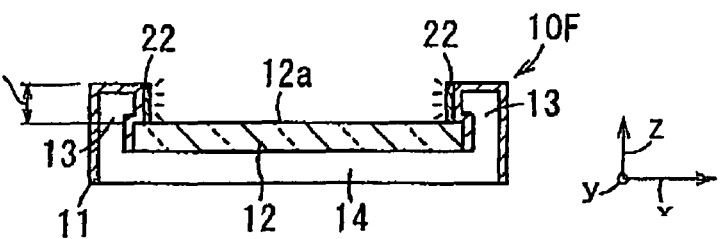
FIG. 18 is a cross-sectional view taken along line A-A' in FIGS. 10A to 10C.

FIG. 18 is a cross-sectional view taken along line A-A' in FIGS. 10A to 10C. A multi-view display apparatus 10F according to a seventh embodiment of the invention includes, for example, a light source 22 that diffusely reflects the display light emitted from the vicinity of the outer periphery of the display face 12a. The amount of protrusion of the frame portion in the z direction from the display face 12a as a reference is designed to be, for example, in a range of approximately 2 mm to approximately 4 mm. By diffusely reflecting the display light emitted from the vicinity of the outer periphery of the display face 12a with the light source 22 provided in the frame portion, the output of display light in a direction to which a display should not be originally directed, can be mitigated, and concealed within a range that does not affect maintenance of display quality and improvement of visibility.

It is also possible to apply a non-illustrated diffuse reflection member instead of the light source 22. In this case, it is possible to simplify the structure in comparison to a structure including the light source 22, so that it is possible to achieve reduced manufacturing costs. In the seventh display apparatus 10F, a configuration may be adopted in which, as shown in FIG. 11C, the light source 22 is installable to or removable from the case main body. It is also possible to configure the frame portion including the light source 22 to be installable to or removable from the display unit. It is not necessary that the frame portion and the light source 22 are provided near the entire peripheral edge portion of the display unit, and they may be provided near at least one edge portion of the display unit corresponding to a location where suppression of reflection of display light outputted from the display face 12a is desired.

Figure 19:
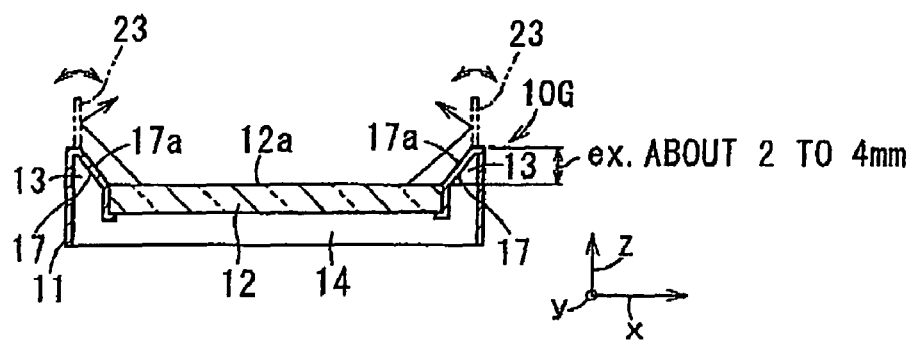
FIG. 19 is a cross-sectional view taken along line A-A' in FIGS. 10A to 10C.

FIG. 19 is a cross-sectional view taken along line A-A' in FIGS. 10A to 10C. A multi-view display apparatus 10G (referred to as an eighth display apparatus 10G) according to an eighth embodiment is configured with a mirror 23, which is an attached component, installable to or removable from the annular wall portion (frame portion) 13 of the third display apparatus 10B. In a state in which the mirror 23 has been installed to the frame portion 13, the angle of the mirror 23 can be changed around an axis line in the y direction. With the mirror 23, it is possible to suppress, before occurring, undesired display (display that is directed to a not-intended direction) that can occur due to the display light emitted from the outer periphery of the display face 12a being reflected by the case 11 and the like, and in addition, by changing the angle of the mirror 23 as necessary, with the mirror 23 it is possible to also view a display that is directed to a not-intended direction. Further, the mirror 23 can be provided only to one side or the other in the x direction. The mirror 23 may be provided fixed to the case 11. The amount of protrusion of the frame portion in the z direction from the display face 12a as a reference is designed to be, for example, in a range of approximately 2 mm to approximately 4 mm. In the eighth display apparatus 10G, a configuration may be adopted in which, as shown in FIG. 11C, the mirror 23 is installable to or removable from the case main body. It is also possible to configure the frame portion including the mirror 23 to be installable to or removable from the display unit. It is not necessary that the frame portion and the mirror portion are provided near the entire peripheral edge portion of the display unit, and they may be provided near at least one edge portion of the display unit corresponding to a location where suppression of reflection of display light outputted from the display face 12a is desired.

Figure 20:
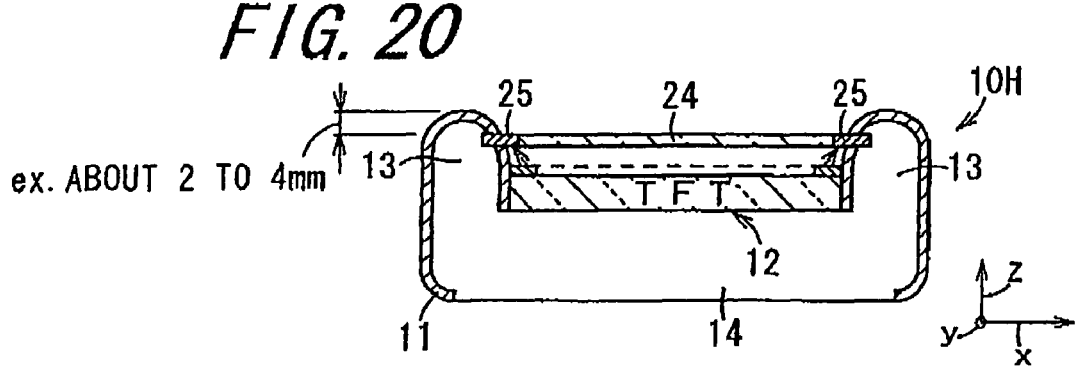
FIG. 20 is a cross-sectional view taken along line A-A' in FIGS. 10A to 10C.

FIG. 20 is a cross-sectional view taken along line A-A' in FIGS. 10A to 10C. In a multi-view display apparatus 10H according to a ninth embodiment of the invention, a member 25 with a light-blocking effect is provided near the outer periphery of a touch panel 24. The light-blocking member 25 corresponds to the reflection suppressing portion. The amount of protrusion of the frame portion in the z direction from the display face 12a as a reference is designed to be, for example, in a range of approximately 2 mm to approximately 4 mm. According to this embodiment, by modifying the design of the touch panel 24 to include the light-blocking member 25, it is possible to maintain display quality and improve visibility. Thus, it is not necessary to change the die or the like of the case 11, and to that extent it is possible to achieve a reduction in manufacturing costs.

In the ninth display apparatus 10H, a configuration may be adopted in which, as shown in FIG. 11C, the light-blocking member 25 is installable to or removable from the case main body. It is also possible to configure the frame portion including the light-blocking member 25 to be installable to or removable from the display unit. It is not necessary that the frame portion and the light-blocking member 25 are provided near the entire peripheral edge portion of the display unit, and they may be provided near at least one edge portion of the display unit corresponding to a location where suppression of reflection of display light outputted from the display face 12a is desired.

Figure 21A:
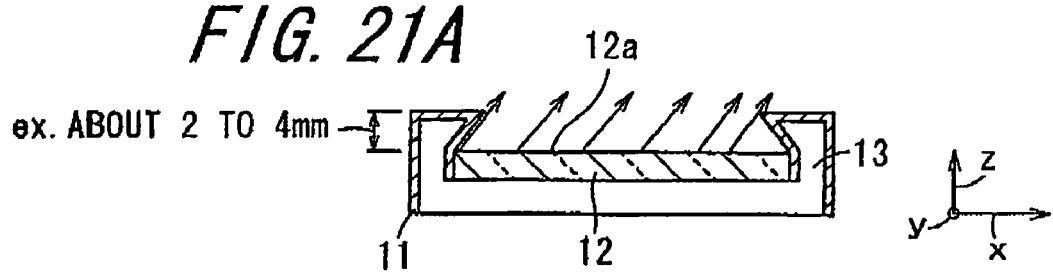
FIGS. 21A to 21C are cross-sectional views taken along line A-A' in FIGS. 10A to 10C.
Figure 21B:
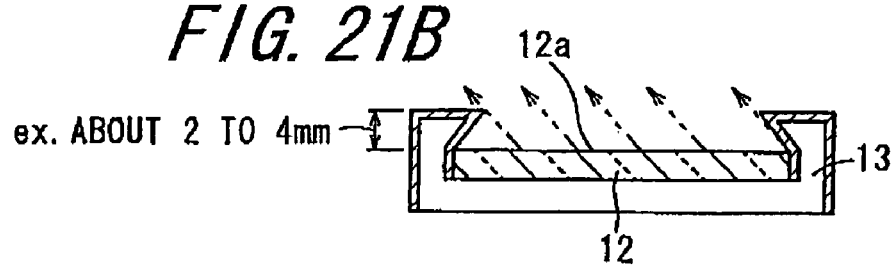
Figure 21C:
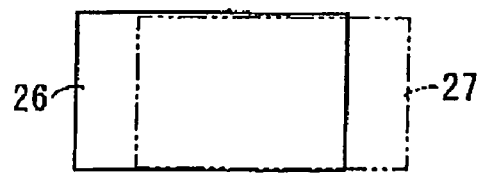
Figure 22:
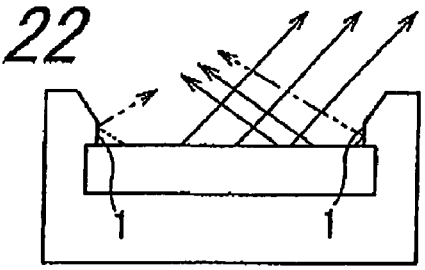
FIG. 22 is a schematic view of the conventional image display apparatus.

FIGS. 21A to 21C are cross-sectional views taken along line A-A' in FIGS. 10A to 10C. In a multi-view display apparatus (referred to as a tenth display apparatus) according to a tenth embodiment, as shown in FIGS. 21A and 21B, by displaying images to the driver seat direction and the passenger seat direction in respective display regions 26 and 27 of the display face 12a such that display light, which is emitted from the vicinity of the outer periphery of the display face 12a and can be reflected at a surrounding portion, is not outputted in advance, it is possible to maintain display quality and improve visibility. Also, the amount of protrusion of the frame portion in the z direction from the display face 12a as a reference is designed to be, for example, in a range of approximately 2 mm to approximately 4 mm.

In the tenth display apparatus, a configuration may be adopted in which, as shown in FIG. 11C, the annular wall portion 13 used as the frame portion is installable to or removable from the case main body. Also, the frame portion may be installable to or removable from the display unit. The shape of the frame portion itself facing the display face 12a corresponds to the reflection suppressing portion. It is not necessary that the frame portion is provided near the entire peripheral edge portion of the display unit, and it may be provided near at least one edge portion of the display unit corresponding to a location where suppression of reflection of display light outputted from the display face 12a is desired.

FIG. 23 is a cross-sectional view taken along line A-A' in FIGS. 10A to 10C. A multi-view display apparatus 10i according to an eleventh embodiment of the invention includes, for example, suppressing means (a reflection suppressing portion) including a layer made of a delustering agent that reduces light reflection. In the eleventh embodiment, it is possible to reduce the reflection of emitted display light with a matte black layer 28 which is a layer provided in a frame portion 29. Also, the amount of protrusion of the frame portion in the z direction from the display face 12a as a reference is designed to be, for example, in a range of approximately 2 mm to approximately 4 mm. The matte black layer 28 corresponds to a layer made of a delustering agent.

With the matte black layer 28, it is possible to reduce the occurrence of reflection itself of the display light in the frame portion 29. Accordingly, it is possible to eliminate a problem in which a portion of an image expected to be invisible in the originally non-visible direction is visible. The matte black layer 28 may be applied to the frame portion29 via various base processing. In that case as well the same effects as in this embodiment are attained. Also in this case, it is not necessary that the frame portion and the reflection suppressing portion are provided near the entire peripheral edge portion of the display unit, and they may be provided near at least one edge portion of the display unit corresponding to a location where suppression of reflection of display light outputted from the display face 12a is desired. The frame portion may be configured installable to or removable from the case main body. The frame portion may also be configured installable to or removable from the display unit.

FIG. 24 is a cross-sectional view taken along line A-A' in FIGS. 10A to 10C. In a multi-view display apparatus 10J according to a twelfth embodiment of the invention, light reflection is reduced by changing the frame shape with an infrared switch 300. In the twelfth embodiment, the infrared switch 300 is provided as switching means in the proximity of the frame portion 310. By applying the infrared switch 300, not a switch with a button structure, in the proximity of the frame portion 310, it is possible to reduce the thickness of the frame portion 310 in the z direction. Moreover, a sloped face portion 310a of the frame portion 310, that is, a small angle (for example, with γ not greater than 15 degrees) can be set for a sloped face portion 310a with aslope angle γ sloping to the outside in the x direction from the base end in the z direction toward the tip end side in the z direction. Also, the amount of protrusion of the frame portion in the z direction from the display face 12a as a reference is designed to be, for example, in a range of approximately 2 mm to approximately 4 mm.

In this manner, with the infrared switch 300, it is possible to change the shape of the frame portion 310, and thus reduce reflection of the display light at the frame portion 310. In this embodiment, the infrared switch 300 is applied as the switching means, but a configuration is also possible in which a switch that switches the switching state with a wireless frequency is applied. Also, a touch panel may be applied as the switching means. In these cases as well, the same effects as in this embodiment are achieved. The wireless switch 300 and the touch panel correspond to an operating member (operating portion). In the twelfth display apparatus 10J, a configuration may be adopted in which, as shown in FIG. 11C, the frame portion is installable to or removable from the case main body. Also, the frame portion in which the sloped face portion 310a is formed may be installable to or removable from the display unit. It is not necessary that the frame portion is provided near the entire peripheral edge portion of the display unit, and it may be provided near at least one edge portion of the display unit corresponding to a location where suppression of reflection of display light outputted from the display face 12a is desired.

Figure 25A:
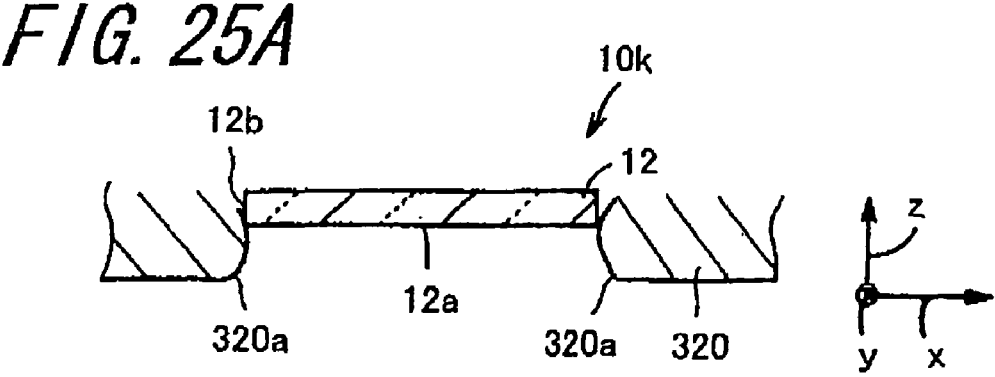
FIGS. 25A and 25B are views showing a multi-view display apparatus 10K according to a thirteenth embodiment of the invention.
Figure 25B:
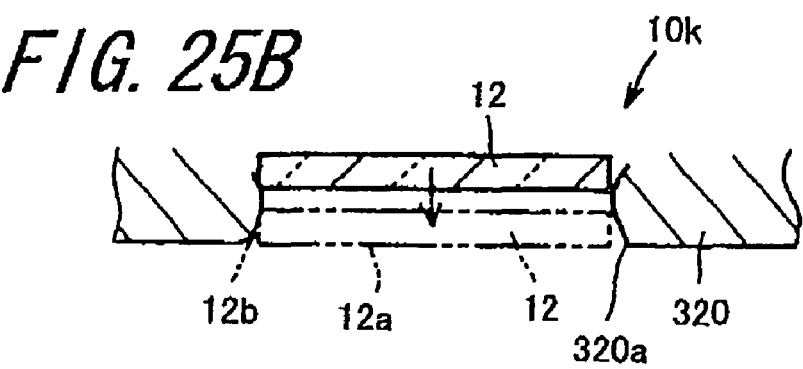

FIGS. 25A and 25B show a multi-view display apparatus 10K according to a thirteenth embodiment of the invention. FIG. 25A shows a state in which the display 12 has been disposed deeper than the surface of an instrument panel 320 of the vehicle. FIG. 25B shows a state in which the amount of protrusion of the display 12 is the same as the surface of the instrument panel 320. In the thirteenth embodiment, an adjustment mechanism is provided that adjusts the amount of protrusion of the display 12 relative to the surface of the instrument panel 320 of the vehicle. The adjustment mechanism can be realized with, for example, a motor-driven sliding display.

The adjustment mechanism is configured from a drive source such as a motor, moving means for slidably moving the display 12 in at least the z direction, and a detector installed in a side face portion of the display 12. The detector is realized with an infrared sensor or the like. Specifically, the detector detects whether a side face portion 12b of the display 12 is in close proximity to an opening peripheral portion 320a of the instrument panel 320. From an output signal of the detector, the adjustment mechanism observes whether or not the display 12 is protruding from the instrument panel 320 in the z direction, and when the display 12 is judged to be protruding, the moving means is stopped by the drive source and the protrusion position of the display 12 is set.

Accordingly, as shown in FIG. 25B, it is possible for one surface portion 12a of the display 12 to be set flush with one surface portion of the instrument panel 320. With such an adjustment mechanism, it is possible to adjust the amount of protrusion of the display 12 relative to the instrument panel 320. It is possible to prevent display light emitted from the display 12 from being reflected by the instrument panel 320. Changes in the direction in which the display light should be outputted can be prevented, thus eliminating a problem in which a portion of an image expected to be originally invisible is visible due to reflection by the instrument panel 320. It is also possible to set the amount of movement of the display 12 with manual operation, and move to the set position when power is turned on. A configuration is also possible in which when both an image for the driver seat and an image for the passenger seat are displayed, i.e. when multi-display is performed, the display 12 is moved with the adjustment mechanism.

Figure 26:
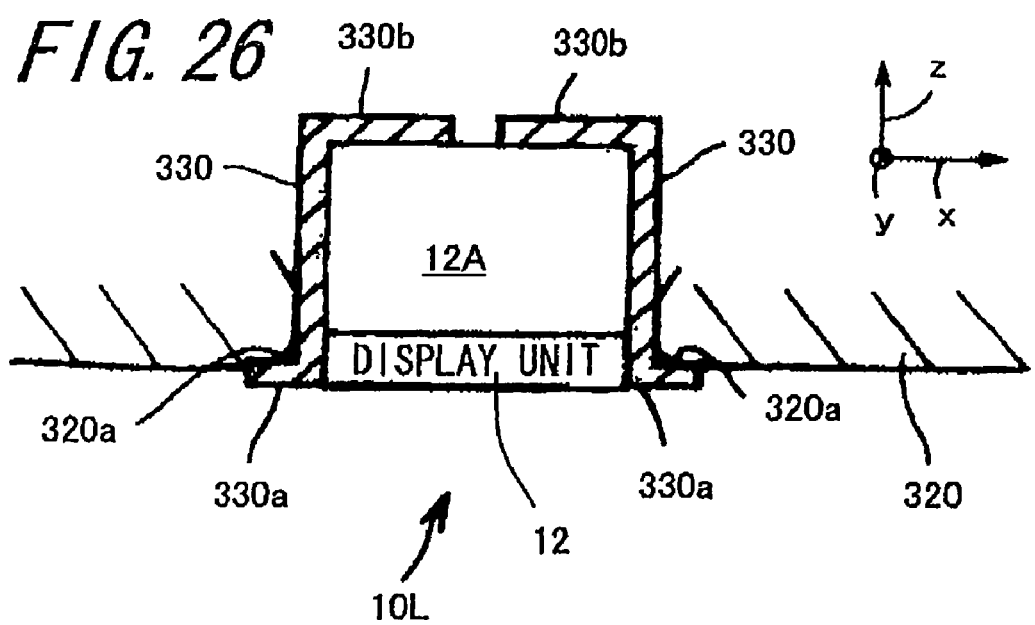
FIG. 26 is a view showing a multi-view display apparatus 10L according to a fourteenth embodiment of the invention, and schematically showing the relationship between hook-like locking members 330, the display 12 and instrument panel 320.

FIG. 26 shows a multi-view display apparatus 10L according to a fourteenth embodiment of the invention, and schematically shows the relationship between hook-like locking members 330, and the display12 and instrument panel 320. In the fourteenth embodiment, the locking members 330 are provided having a function of regulating the depth of the display 12 relative to the instrument panel 320. The locking members 330 are formed in an approximately L-like shape, and the display 12 is supported in the instrument panel 320 of the vehicle by a pair of the locking members 330.

The locking members 330 serving as suppressing means (a reflection suppressing portion), are configured to be installable to or removable from the instrument panel 320 and a display unit 12A. A first locking portion 330a of each locking member 330 is locked at an opening peripheral portion 320a, and the rear face portion of the display unit 12A is locked at a second locking portion 330b of each locking member 330. In this manner, the multi-view display apparatus is configured so that the depth of the display 12 relative to the instrument panel 320 is regulated. A configuration is also possible in which the installation position of the display 12 relative to the instrument panel 320 is adjustable with the pair of locking members 330. With this configuration, it is possible to more effectively maintain display quality and improve visibility.

With the locking members 330 according the fourteenth embodiment described above, the depth of the display 12 relative to the instrument panel 320 is regulated, so that it is possible to prevent the display light from being reflected by the instrument panel 320. Such locking members330 are configured to be installable to or removable from the multi-view display apparatus, so that assembly work is easy, and installation can be unconstrained. Reflection prevention processing such as emboss formation or delustering may be executed on the first locking portions 330a of the locking members 330 exposed to the outside. In this case, it is also possible to prevent the display light from being reflected by the first locking portions 330a themselves.

The locking members are not necessarily limited to an approximately L-like shape. The locking members may be configured extendable in at least either one of the x direction and the y direction. With this sort of configuration, the invention is compatible with vehicle applications and household applications or the like that have different sizes and specifications. Accordingly, with this configuration, the invention can be applied to both vehicle and household use, so the general usability of locking members themselves can be increased. In each embodiment, the display apparatus was for use in a vehicle, but the invention is not limited to use in a vehicle. Additionally, the invention may be embodied in various other modified forms that do not depart from the gist of the invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

Industrial Applicability

According to the invention, with a reflection suppressing portion, it is possible to suppress, before occurring, undesired display (for example, display that is directed to a not-intended direction) that can occur due to the display light emitted from the display unit being reflected by the frame portion, and thus it is possible to maintain display quality and to improve visibility.

Also, according to the invention, with a light attenuation portion provided in at least a part of the frame portion, it is possible to prevent display light emitted from the display means from being reflected by the frame portion. That is, it is possible to attenuate light that is emitted from the edge of the display unit and reaches the frame portion.

Also, according to the invention, with a reflection angle modification portion, by reflecting emitted display light to a desired direction, the range of the position and direction in which the reflected display light is visible can be expanded, not fixed. In this manner, the direction in which display light is outputted can be unconstrained.

Also, according to the invention, with a reflectance reduction portion that reduces the light reflectance, it is possible to prevent, as much as possible, the display light emitted from the display unit from being reflected by the frame portion. Changes in the direction in which the display light should be outputted can be prevented, thus eliminating a problem in which a portion of an image expected to be invisible in the originally non-visible direction is visible.

Also, according to the invention, light to arrive at a reflection prevention portion can be cancelled from emitted display light with a light interference action. That is, light that is emitted from the edge portion of the display unit and is to arrive at the frame portion can be cancelled.

Also, according to the invention, with a light source, by diffusely reflecting the display light emitted from the edge portion of the display unit, it is possible to mitigate the output of display light in a direction to which a display should not be originally directed.

Also, according to the invention, with a delustering agent that reduces reflection of display light, the reflection of display light at the frame portion is reduced. Accordingly, it is possible to eliminate a problem in which a portion of an image expected to be invisible in the originally non-visible direction is visible.

Also, according to the invention, by providing an operating portion at a position where arrival of display light emitted from the display unit at operating portion is avoided, it is possible to diminish reflection at a protruding member used as the operating portion.

Also, according to the invention, the frame portion is configured installable to or removable from the display unit, so that assembly work is easy, and installation can be unconstrained.

Also, according to the invention, a reflection suppressing portion is configured installable to or removable from the frame portion, so that assembly work is easy, and installation can be unconstrained.

Also, according to the invention, with a protrusion amount adjustment portion, it is possible to adjust the amount of protrusion of the display unit relative to the portion to which the display unit is installed. It is possible to prevent the display light emitted from the display unit from being reflected by the portion to which the display unit is installed. Changes in the direction in which the display light should be outputted can be prevented, thus eliminating a problem in which a portion of an image expected to be invisible in the originally non-visible direction is reflected by the portion to which the display unit is installed and thus visible.

Also, according to the invention, the frame portion is configured installable to or removable from the display unit, so that assembly work is easy, and installation can be unconstrained. Also, according to the invention, the reflection suppressing portion is configured installable to or removable from the frame portion, so that assembly work is easy, and installation can be unconstrained.

The invention claimed is:

1. A display apparatus comprising:
    a display unit for displaying individual images in a plurality of viewing directions on a common screen;
    a frame portion through which an opening is formed that exposes the common screen for viewing through the opening, the frame portion provided near at least one edge portion of the display unit; and
    a reflection suppressing portion provided in at least one part of the frame portion at a periphery of the opening, the reflection suppressing portion suppressing an image that should he outputted to one viewing direction from being reflected to another viewing direction at the frame portion.

2. The display apparatus of claim 1, wherein the reflection suppressing portion includes a light-attenuation portion that attenuates display light emitted from the display unit.

3. The display apparatus of claim 1, wherein the reflection suppressing portion includes a reflection angle modification portion that reflects an image that should be outputted in the one direction in a direction other than the other viewing direction.

4. The display apparatus of claim 1, wherein the reflection suppressing portion includes a reflectance reduction portion that reduces the reflectance of display light emitted from the display unit.

5. The display apparatus of claim 1, wherein the reflection suppressing portion includes a reflection prevention portion that causes cancellation of display light emitted from the display unit by using light interference.

6. The display apparatus of claim 1, wherein the reflection suppressing portion includes a light source that diffusely reflects display light emitted from a vicinity of an edge portion of the display unit.

7. The display apparatus of claim 1, wherein the reflection suppressing portion is configured by applying a delustering agent that reduces reflection of display light emitted from the display unit.

8. The display apparatus of claim 1, wherein the frame portion is configured installable to or removable from the display unit.

9. The display apparatus of claim 1, wherein the reflection suppressing portion that suppresses an image that should be outputted in one viewing direction, from being reflected to another viewing direction at the frame portion, is configured installable to or removable from at least one part of the frame portion.

10. A frame member provided near at least one edge portion of a display unit for displaying individual images in a plurality of viewing directions on a common screen,
    wherein the frame member is configured installable to or removable from the display unit,
    an opening is formed through the frame member that exposes the common screen for viewing the opening, and
    the frame member is provided, in at least one part at a periphery of the opening, with a reflection suppressing portion that suppresses an image that should he outputted to one viewing direct ion from being reflected to another viewing direction at the frame member.

11. A reflection suppressing member provided in at least one part of a frame portion provided near at least one edge portion of a display unit for displaying individual images in a plurality of viewing directions on a common screen,
    wherein an opening is formed through the frame portion that exposes the common screen for viewing, through the opening, the reflection suppressing member is configured installable to or removable from the frame portion at a periphery of the opening, and the reflection suppressing member suppresses an image that should be outputted in one viewing direction, from being reflected to another viewing direction at the frame portion.

* * * * *